United States Patent
Terrell et al.

(10) Patent No.: US 9,304,988 B2
(45) Date of Patent: Apr. 5, 2016

(54) SYSTEM AND METHOD FOR PERFORMING AUTOMATIC AUDIO PRODUCTION USING SEMANTIC DATA

(71) Applicant: LANDR AUDIO INC., Montreal (CA)

(72) Inventors: Michael John Terrell, London (GB); Stuart Mansbridge, Penrith (GB); Joshua D. Reiss, London (GB); Brecht De Man, London (GB)

(73) Assignee: LANDR AUDIO INC., Montreal (CA)

( * ) Notice: Subject to any disclaimer, the term of this patent is extended or adjusted under 35 U.S.C. 154(b) by 2 days.

(21) Appl. No.: 14/471,758

(22) Filed: Aug. 28, 2014

(65) Prior Publication Data

US 2015/0066481 A1  Mar. 5, 2015

Related U.S. Application Data

(60) Provisional application No. 61/871,168, filed on Aug. 28, 2013.

(51) Int. Cl.
| | | |
|---|---|---|
| *G10L 21/00* | (2013.01) | |
| *G06F 17/27* | (2006.01) | |
| *G06F 17/28* | (2006.01) | |

(52) U.S. Cl.
CPC ............ *G06F 17/2785* (2013.01); *G06F 17/28* (2013.01)

(58) Field of Classification Search
CPC ....... G10L 15/22; G10L 15/063; G10L 13/04; G10L 13/06; G10L 15/1815; G10L 15/183; G06F 17/30743; G06F 17/30864; G06F 17/30749; G06F 17/27; G06F 17/30761; G06F 17/30772; G06F 17/30893; G06F 21/6227; G06F 17/30053; G06F 17/30312; G06F 17/3002; G06F 17/2785; G10H 1/0008; G10H 2240/075

USPC ........ 704/1–10, 270, 243, 257–258; 707/769, 707/802, 791; 340/4.14
See application file for complete search history.

(56) References Cited

U.S. PATENT DOCUMENTS 6,032,156 A * 2/2000 Marcus ............ G06F 17/30029
8,069,036 B2 11/2011 Pauws et al.
(Continued)

FOREIGN PATENT DOCUMENTS

WO  2012/104119  8/2012

OTHER PUBLICATIONS

Daniele Barchiesi et al: "Automatic Target Mixing Using Least-Squares Optimization of Gains and Equalization Settings", Proc. of the 12th Int. Conference on Digital Audio Effects (DAFx-09), Como, Italy, Sep. 1-4, 2009, pp. 1-8.

(Continued)

*Primary Examiner* — Marivelisse Santiago Cordero
*Assistant Examiner* — Stephen Brinich
(74) *Attorney, Agent, or Firm* — McDonnell Boehnen Hulbert & Berghoff LLP

(57) ABSTRACT

There is described a computer implemented method for performing automatic audio production, comprising: receiving an audio signal to be processed; receiving semantic information; determining at least one semantic-based rule using the received semantic information, the semantic-based rule comprising production data that defines how the audio signal to be processed should be produced; processing the audio signal to be processed using the production data, thereby obtaining a produced audio signal; outputting the produced audio signal.

29 Claims, 22 Drawing Sheets

(56) References Cited

U.S. PATENT DOCUMENTS

| | | | |
|---|---|---|---|
| 2006/0196337 A1* | 9/2006 | Breebart | G06F 17/30743 84/1 |
| 2007/0286358 A1* | 12/2007 | Pomerantz | G10L 15/22 379/67.1 |
| 2009/0062949 A1* | 3/2009 | Heo | G06F 17/30749 700/94 |
| 2010/0223223 A1 | 9/2010 | Sandler et al. | |

OTHER PUBLICATIONS

Alice Clifford et al: "Calculating time delays of multiple active sources in live sound", Audio Engineering Society, Convention Paper 8157, Presented at the AES 129th Convention, San Francisco, United States of America, Nov. 4-7, 2010, pp. 1-8.

Brecht De Man et al.: "A knowledge-engineered autonomous mixing system", Audio Engineering Society, Convention Paper 8961, Presented at the AES 135th Convention, New York, United States of America, Oct. 17-20, 2013, pp. 1-11.

Brecht De Man et al.: "A Semantice Approach to Autonomous Mixing", Journal on the Art of Record Production, Dec. 2013, pp. 1-23, Issue 8, ISSN: 1754-9892.

Enrique Perez Gonzalez et al.: "A Real-Time Semiautonomous Audio Panning System for Music Mixing", EURASIP Journal on Advances in Signal Processing, Apr. 23, 2010, pp. 1-10, vol. 2010, Article ID 436895,Hindawi Publishing Corporation.

Enrique Perez Gonzalez et al.: "An automatic maximum gain normalization technique with applications to audio mixing", Audio Engineering Society, Convention Paper, Presented at the AES 124th Convention, Amsterdam, The Netherlands, May 17-20, 2008, pp. 1-8.

Enrique Perez Gonzalez et al.: "Automatic equalization of multichannel audio using cross-adaptive methods", Audio Engineering Society, Convention Paper, Presented at the AES 127th Convention, New York, United States of America, Oct. 9-12, 2009, pp. 1-6.

Enrique Perez Gonzalez et al.: "Automatic Gain and Fader Control for Live Mixing", Application of Signal Processing to Audio and Acoustics, 2009 IEEE Workshop, New Paltz, United States of America, Oct. 18-21, 2009, pp. 1-4.

Enrique Perez Gonzalez et al.: "Authomatic Mixing: Live Downmixing Stereo Panner", Proc. of the 10th Int Conference on Digital Audio Effects (DAFx-07), Bordeaux, France, Sep. 10-15, 2007, pp. 1-6.

Enrique Perez Gonzalez et al: "Determination and correction of individual channel time offsets for signals involved in an audio mixture", Audio Engineering Society, Convention Paper, Presented at the AES 125th Convention, San Francisco, United States of America, Oct. 2-5, 2008, pp. 1-10.

Enrique Perez Gonzalez et al: "Improved Control for Selective Minimzation of Masking using Inter-Channel Dependancy Effects", Proc. of the 11th Int. Conference on Digital Audio Effects (DAFx-08), Espoo, Finland, Sep. 1-4, 2008, pp. 1-7.

Stuart Mansbridge et al.: "Implementation and Evaluation of Autonomous Multi-track Fader Control", Audio Engineering Society, Convention Paper 8588, Presented at the AES 132nd Convention, Budapest, Hungary, Apr. 26-29, 2012, pp. 1-11.

Martin J. Morrell et al.: "Dynamic Panner: An Adaptive Digital Audio Effect for Spatial Audio", Audio Engineering Society, Convention Paper, Presented at the AES 127th Convention, New York, United States of America, Oct. 9-12, 2009, pp. 1-20.

Joshua D. Reiss: "Intelligent Systems for Mixing Multichannel Audio", Proc. of the 17th Int. Conference on Digital Processing (DSP), Corfu, Greece, Jul. 6-8, 2011, pp. 1-6.

Michael Terrell et al.: "An Offline, Automatic, Mixing Method for Live Music, Incorporating Multiple Sources, Loudspeakers, and Room Effects", Computer Music Journal, 36:2, Massachusetts, United States of America, Summer 2012, pp. 37-54, Massachusetts Institute of Technology.

Dr. M. J. Terrell et al.: "Automatic Noise Gate Settings for Multitrack Drum Recordings", Proc. of the 12th Int. Conference on Digital Audio Effects (DAFx-09), Como, Italy, Sep. 1-4, 2009, pp. 1-8.

Dr. Michael Terrell et al.: "Optimising the Controls of a Homogeneous Loudspeaker Array", Audio Engineering Society, Convention Paper 8159, Presented at the AES 129th Convention, San Francisco, United States, Nov. 4-7, 2010, pp. 1-9.

Michael J. Terrell et al.: "Sounds not Signals: A Perceptual Audio Format", Audio Engineering Society, Convention e-Brief, Presented at the AES 132nd Convention, Budapest, Hungary, Apr. 26-29, 2012, pp. 1-5.

International Search Report and Written Opinion for Int. App. No. PCT/CA2014/000662, mailed Nov. 3, 2014.

Vercoe, Barry L., et al., "Structured Audio: Creation, Transmission, and Rendering of Parametric sound Representations," Proceedings of the IEEE, vol. 86, No. 5, pp. 922-940, 1998.

* cited by examiner

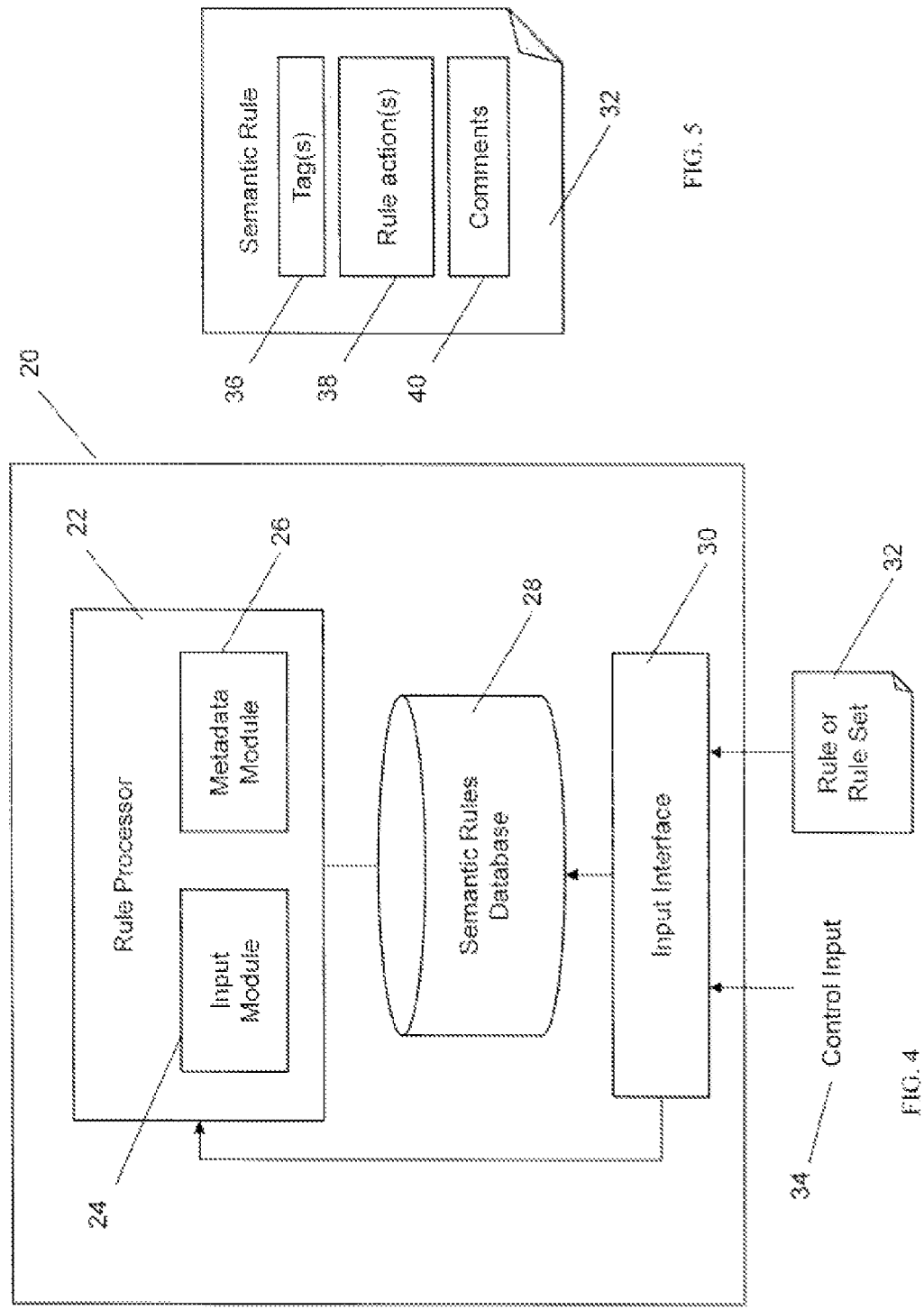

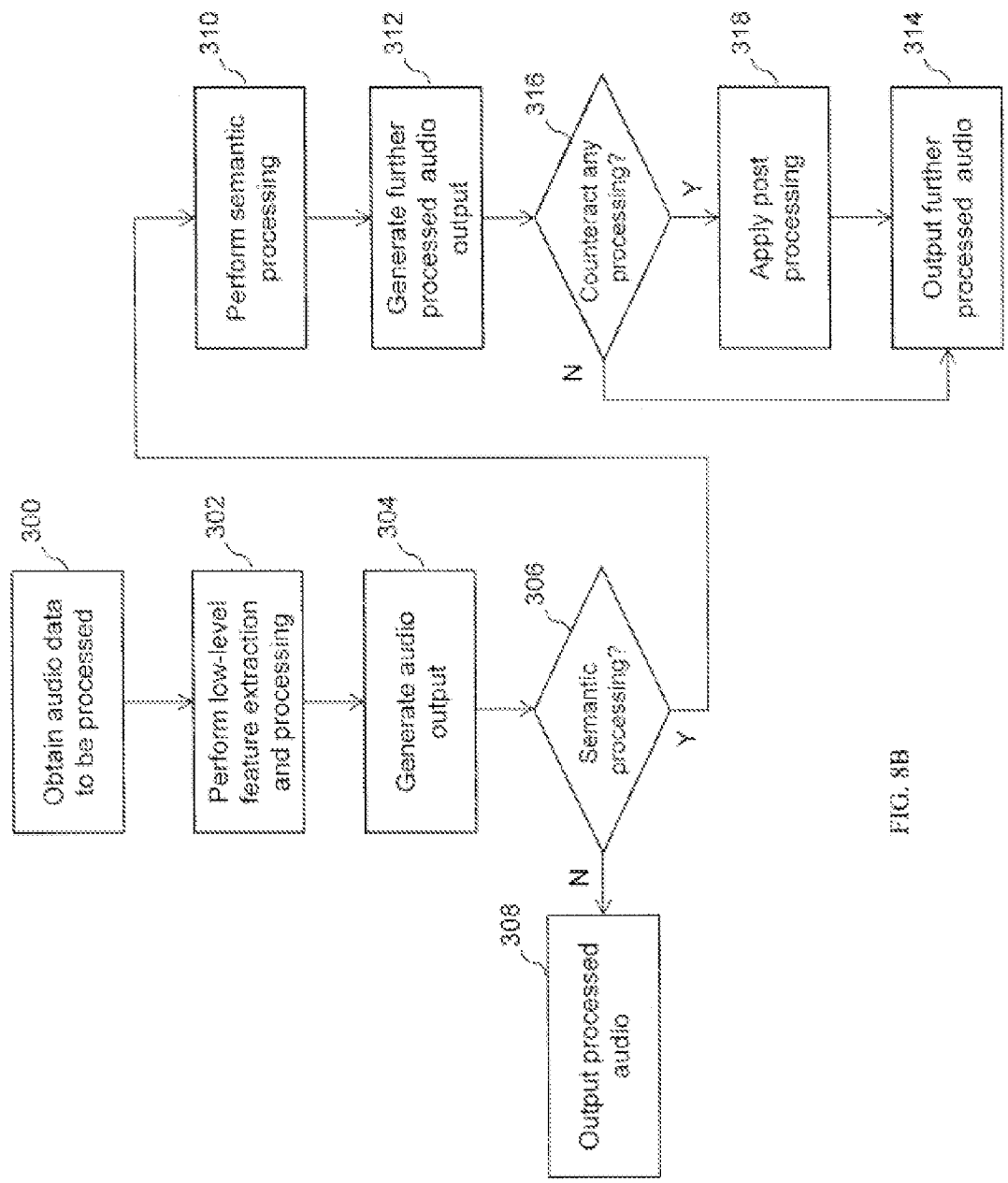

SYSTEM AND METHOD FOR PERFORMING AUTOMATIC AUDIO PRODUCTION USING SEMANTIC DATA

CROSS-REFERENCE TO RELATED APPLICATIONS

This application claims priority of U.S. Provisional Patent Application Ser. No. 61/871,168, which was filed on Aug. 28, 2013 and is entitled "System and method for performing automatic audio mixing using semantic rules", the specification of which is hereby incorporated by reference.

TECHNICAL FIELD

The following relates to systems and methods for performing automatic audio processing, and more particularly using semantic data.

BACKGROUND

In all fields of audio production (e.g. studio recording, live performance, broadcast) it is common to process the audio signals using a range of signal processing tools. This includes processing individual audio signals, e.g. mastering a finished mix; and processing and combining multiple audio signals that are produced by different acoustic sources, e.g. the component instruments within an ensemble. The objectives of this processing are to either improve the aesthetic characteristics of the resultant audio signal, e.g. to produce a high-quality mixture when combining multiple signals; or to adhere to some functional constraints in relation to the transmission, e.g. to minimise signal degradation due to data compression such as mp3, or to mitigate the effects of background noise on an airplane. At present, this work is done manually by skilled audio engineers, who are usually specialised in a specific area of production. The tasks that they perform can be very labour intensive, and for amateurs, there is a steep learning curve to enter the field, and often prohibitive costs in purchasing audio equipment.

Therefore, there is a need for automatic audio production.

SUMMARY

According to a first broad aspect, there is provided a computer implemented method for performing automatic audio production, comprising: receiving an audio signal to be processed; receiving semantic information; determining at least one semantic-based rule using the received semantic information, the semantic-based rule comprising production data that defines how the audio signal to be processed should be produced; processing the audio signal to be processed using the production data, thereby obtaining a produced audio signal; outputting the produced audio signal.

In one embodiment, the semantic information relates to the audio signal to be processed.

In one embodiment, the semantic information is received from a user interface.

In one embodiment, the method further comprises determining the semantic information from the received audio signal.

In another embodiment, the semantic information relates to a reference audio signal, the method further comprising: receiving the reference audio signal; and extracting the semantic information from the reference audio signal.

In one embodiment, the semantic information comprises at least one of chromosomal features, classification features, and production features.

In one embodiment, the production data comprises at least one of given audio processing actions to be performed and respective static characteristics for the given audio processing actions, a configuration for the audio processing actions, and target production features for the produced audio signal.

In one embodiment, the step of determining the semantic-based rule comprising production data comprises: accessing a database containing a plurality of reference records each comprising respective reference classification features, respective reference chromosomal features, a respective reference configuration for reference processing actions, respective reference static characteristics for the reference processing actions, and respective reference production features; identifying at least one reference record that match the at least one of chromosomal features, classification features, and production features contained in the semantic information; and assigning a value for the at least one of the given audio processing actions to be performed and the respective static characteristics for the given audio processing actions, the configuration for the audio processing actions, and the target production features for the produced audio signal using the at least one identified reference record.

In one embodiment, the method further comprises determining dynamic characteristics for the given processing actions using the value assigned to the target production features.

In one embodiment, the step of processing the audio signal comprises performing the given audio processing actions on the audio signal according to the configuration and using the static and dynamic characteristics.

In one embodiment, the method further comprises determining a value of the production features between the given audio processing actions and modifying the dynamic characteristics accordingly.

In one embodiment, the steps of receiving the audio signal to be processed and outputting the produced audio signal are performed in substantially real-time so that the audio signal to be processed and the produced audio signal be synchronized.

In one embodiment, the production data is determined for only one region of the audio signal to be processed.

In one embodiment, the method further comprises the step of receiving user production preferences, said processing the audio signal being performed using the production data and the user production preferences.

In one embodiment, the method further comprises receiving an evaluation of the produced audio signal from a user and determining the user production preferences using the received evaluation.

In accordance with a second broad aspect, there is provided a computer readable medium having recorded thereon statements and instructions for execution by a processing unit to perform the steps of the above-described method.

In accordance with another broad aspect, there is provided an automatic audio production system comprising: a semantic analysis module for receiving semantic information and determining at least one semantic-based rule using the received semantic information, the semantic-based rule comprising production data that defines how an audio signal to be processed should be produced; and an audio processing module for receiving the audio signal to be processed, processing the audio signal to be processed using the production data, in order to obtain a produced audio signal, and outputting the produced audio signal.

In one embodiment, the semantic information relates to the audio signal to be processed.

In one embodiment, the semantic analysis module is adapted to receive the semantic information from a user interface.

In one embodiment, the semantic analysis module is further adapted to receive the audio signal to be processed and determine the semantic information from the audio signal to be processed.

In another embodiment, the semantic information relates to a reference audio signal, the semantic analysis module being further adapted to: receive the reference audio signal; and extract the semantic information from the reference audio signal.

In one embodiment, the semantic information comprises at least one of chromosomal features, classification features, and production features.

In one embodiment, the production data comprises at least one of given audio processing actions to be performed and respective static control parameters for the given audio processing actions, a configuration for the audio processing actions, and target production features for the produced audio signal.

In one embodiment, the system further comprises a production database containing a plurality of reference records each comprising respective reference classification features, respective reference chromosomal features, a respective reference configuration for reference processing actions, respective reference static control parameters for the reference processing actions, and respective reference production features, the semantic analysis module being adapted to: identify at least one reference record that match the at least one of chromosomal features, classification features, and production features contained in the semantic information; and assign a value for the at least one of the given audio processing actions to be performed and the respective static control parameters for the given audio processing actions, the configuration for the audio processing actions, and the target production features for the produced audio signal using the at least one identified reference record.

In one embodiment, the audio processing module is adapted to determine dynamic control parameters for the given processing actions using the value assigned to the target production features.

In one embodiment, the audio processing module comprises a plurality of audio processors and is adapted to organize the plurality of audio processors according to the configuration and control the plurality of audio processors according to the static and dynamic control parameters.

In one embodiment, the audio processing module is further adapted to determine a value of the production features between the audio processors and modify the dynamic parameters accordingly.

In one embodiment, an input of the audio signal to be processed and an output of the produced audio signal are performed in substantially real-time so that the audio signal to be processed and the produced audio signal be synchronized.

In one embodiment, the semantic analysis module is adapted to determine the production data for only one region of the audio signal to be processed.

In one embodiment, the semantic analysis module is further adapted to receive user production preferences and determine the production data using the user production preferences.

In one embodiment, the system further comprises a production evaluation module for receiving an evaluation of the produced audio signal from a user and determine the user production preferences using the received evaluation.

In other aspects, there are provided systems, devices, and computer readable media configured to perform the above methods.

While they are used for processing an audio signal, it should be understood that the above-described method and system may be used for processing more than one audio signal. For example, the method and system may receive an audio file containing more at least one audio signal and process the at least one audio signal using the same method as for a single audio signal. When the audio file contains more than one audio signal, the processed audio signals may further be mixed together.

BRIEF DESCRIPTION OF THE DRAWINGS

Embodiments will now be described by way of example only with reference to the appended drawings wherein:

FIG. 4 is a block diagram of an example of an illustrative configuration for a semantic processing module;

FIG. 5 is an illustrative depiction of an example of a semantic rule;

FIGS. 8A to 8D are flow charts illustrating example computer executable instructions that may be performed in performing semantic mixing in conjunction with cross-adaptive audio processing using an autonomous multi-track mixing engine;

DETAILED DESCRIPTION

Figure 1:
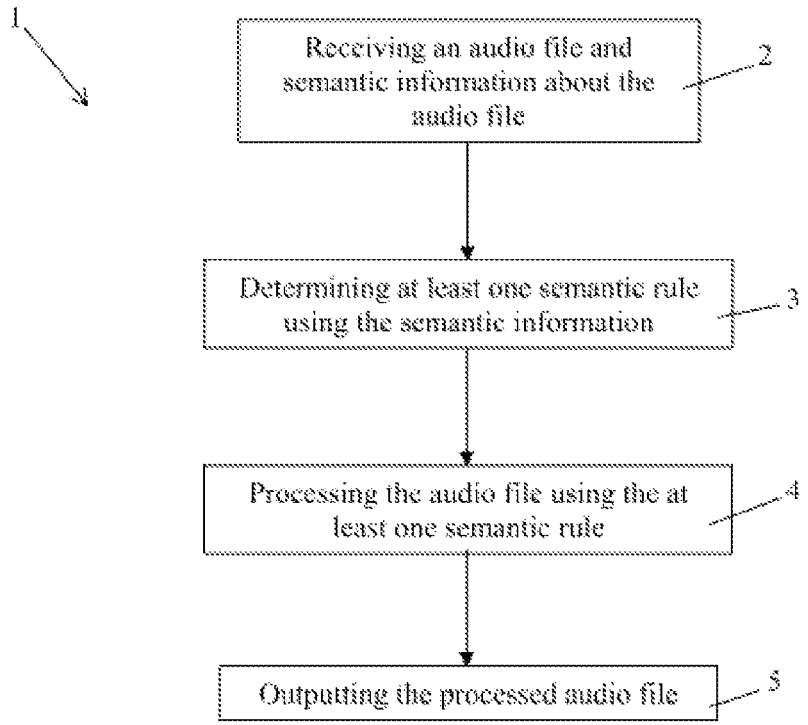
FIG. 1 is a flow chart of a method for processing an audio file using a semantic rule, in accordance with an embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It has been found that despite advances in automatic audio production systems, there is no single set of control parameters or production objectives that will work well in all situations. For example, production objectives will vary according to instrumentation and genre (e.g. electronic dance music is generally far louder than Jazz music), individuals may favor the sound of a processing tool with a specific control parameter set (e.g. a distortion unit with a specific tube-amp analogue emulation), or with a specific configuration of processing tools; and both control parameters and production objectives should adapt depending on the output destination (e.g. to be played in a quiet room or a noisy airplane). Existing automatic audio production systems do not take these factors into account.

To address these considerations, the following describes the incorporation of semantic-based analysis that uses data and/or measurements from audio signals to determine the audio processing actions to be performed on the audio signals. Such semantic-based audio analysis can be performed separate from or in conjunction with autonomous audio production. Using production data to produce audio may be interpreted as enforcing a set of semantic-based rules that have been derived using semantic data. These semantic-based rules may be static, whereby the rules prescribe fixed processing setup, e.g. processor configuration and control parameters; or dynamic, whereby the rules prescribe production objectives, and the processing setup varies (dynamically) depending on specific features of the input audio signal.

FIG. 1 illustrates one embodiment of a computer-implemented method 1 for processing an audio signal or audio signals according to semantic rules. At step 2, an audio file to be processed is received along with semantic information about the audio file. The audio file may comprise a single audio signal to be processed or a plurality of audio signals to be processed and mixed together. The semantic information about the audio file may be inputted by a user via a user interface and received from the user interface. In the same or another embodiment, the semantic information about the audio file may be automatically determined from the audio file itself.

At step 3, at least one semantic rule to be applied to the audio file is determined from the received semantic information. A semantic rule contains production data to be used for processing the audio file. The production data describes how the audio file should be produced. For example, the production data may be indicative of a type of audio processing actions to be performed, characteristics/parameters for the audio processing actions, a configuration or sequence for the audio processing actions to be performed, and/or desired target production features that the processed audio signal should have. The desired target production features are then used for determining dynamic control characteristics for the audio processing actions.

In one embodiment, the semantic rule is static. As described below, a static semantic rule defines a specific action/processing to be performed on the audio file and parameters for the specific action/processing, e.g. One example of a static semantic rule is as follows: "if kick drum is present, then put equalizer on bass guitar at 100 Hz, gain at −3 dB, quality factor at 2.2". Alternatively, a semantic rule may be dynamic. As described below, a dynamic semantic rule defines a desired target value for a production feature of the processed audio file. An exemplary dynamic semantic rule may be as follows: "obtain a target output root mean square (RMS) level of about −6.5 dB for the processed audio file".

At step 4, the audio file is processed according to the determined semantic rule. In an embodiment in which the semantic rule is static, the processing action defined in the static semantic rule is applied to the audio file in order to obtain the processed audio file. In an embodiment in which the semantic rule is dynamic, the processing action(s) that allow obtaining the desired target value for the production feature is first determined, and then the determined processing action is performed on the audio file in order to obtain the processed audio file. Referring back to the example, the processing action required for modifying the RMS level, i.e. using a limiter, is first determined, and the parameters of the limiter for bringing the RMS from its initial value to about −6.5 dB are then determined. Then the determined processing action is applied to the audio file.

In an embodiment in which more than one processing action to be performed on the audio file is determined, the method 1 may further comprise a step of determining an execution order or sequence for the processing actions to be performed. This corresponds to determining the configuration for the audio processors that will process the audio file, i.e. the relative position of the audio processors within the chain of audio processors.

If the audio file comprises more than on audio signal, the processing step 4 may comprise the step of processing the audio signals according to the semantic rule(s) and mixing together the processed audio signals.

At step 5, the processed audio file is outputted. In one embodiment, the processed audio file is stored in permanent or temporary memory. In the same or another embodiment, the processed audio file is sent to an audio renderer or sound system to be played back via a speaker for example.

Figure 2:
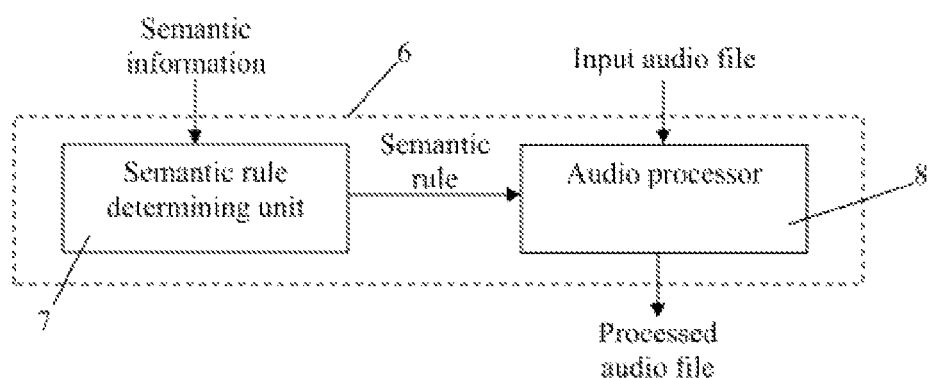
FIG. 2 is a block diagram of a system for processing an audio file using a semantic rule, in accordance with an embodiment.

FIG. 2 illustrates one embodiment of a system 6 for processing an audio file according to at least one semantic rule. The system 6 comprises a semantic rule determining unit 7 and an audio processor 8. The semantic rule determining unit 7 is adapted to receive semantic information about the audio file to be processed, and determine at least one semantic rule to be applied to the audio file, as described in greater detail below. In one embodiment, the semantic rule determining unit 7 is adapted to determine at least one static semantic rule. In another embodiment, the semantic rule determining unit 7 is adapted to determine at least one dynamic semantic rule. It should be understood that the semantic rule determining unit 7 may also be adapted to determine at least one static semantic rule and at least one dynamic semantic rule for a same audio file.

The audio processor 8 is adapted to receive the audio file to be processed, and is in communication with the semantic rule determining unit 7 so as to receive the determined semantic rule therefrom. The audio processor 8 is adapted to apply the semantic rule to the audio file in order to obtain a processed audio file, and output the processed audio file.

In an embodiment in which the determined semantic rule is dynamic, the audio processor 8 is adapted to first determine the type and corresponding parameters of processing action to be performed on the input audio file, and then perform the determined processing action on the audio file in order to obtain the processed audio file.

In an embodiment in which the input audio file comprises more than one audio signal, the audio processor 8 may be adapted to process at least one of the input audio signals and subsequently mix the audio signals together to obtain a processed audio file.

The following illustrates an example of a system and a static semantic rule base that may be derived from practical mixing engineering literature and other sources.

Figure 3:
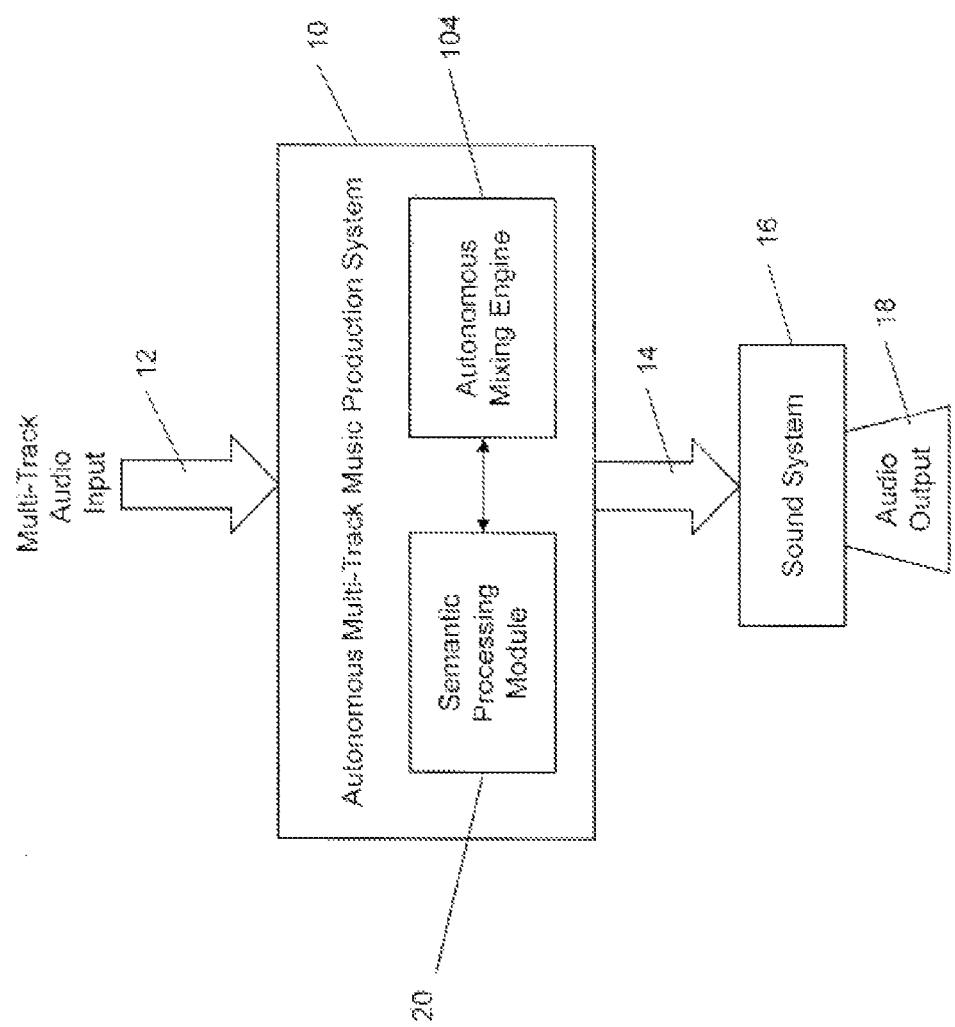
FIG. 3 is a block diagram of an example of an autonomous multi-track music production system and a semantic processing module for such a system.

Turning now to FIG. 3, an autonomous multi-track music production system (the "production system 10" hereinafter) is shown, which processes a multi-track audio input 12 according to static semantic rules and generates an audio output 14 often referred to as a "mix" to be played by a sound system 16. The sound system 16 in turn generates an audio output 18 that is played in a listening space, environment, "room", or other volume of space in which the audio output 18 can be/is played and heard. As shown in FIG. 3, the production system 10 may include an autonomous mixing engine 104 and a semantic processing module 20.

FIG. 4 illustrates an example of a configuration for the semantic processing module 20. It can be appreciated that the functional blocks shown in FIG. 4 are purely illustrative. The semantic processing module 20 in this example includes a static semantic rule processor 22 for processing inputs and metadata using an input module 24 and metadata module 26 respectively in order to determine which of a number of pre-stored semantic rules 32 should be selected from a static semantic rules database 28 (or other suitable memory, library, catalogue, data store, etc.) and applied in order to selectively process an audio input 12 to generate a processed output 18 that considers semantic or "knowledge-based" information. The semantic processing module 20 may also include an input interface 30 to enable the semantic processing module 20 to receive and process control inputs 34 (e.g. for processing user inputs, inputs from the autonomous mixing processor 104, etc.) and/or to receive new static semantic rules 32 or sets of static semantic rules 32 for updating the static semantic rules database 28. For example, as new static semantic rules 32 are developed or as variations are created according to user preferences or styles, such new rules 32 can be loaded or otherwise incorporated into the library or collection of static semantic-based rules 28 for subsequent use.

FIG. 5 illustrates an illustrative example of a static semantic rule 32. In this example, each static semantic rule 32 includes one or more tags 36 to allow various information about the static semantic rule 32 to be recognized. For example, the tag 36 can be generated as comma-separated words denoting the source of the static semantic rule 32 (sources can be included or excluded for comparison purposes), the instrument(s) it should be applied to (or generic'), the genre(s) it is applicable in (or 'all'), the processor(s) it concerns, etc. Based on these tags 36, the rule processor 22 determines if the static semantic rule 32 should be applied, and on which track. It can be appreciated that the order and number of tags 36 does not need to be fixed.

The static semantic rule 32 also includes one or more rule actions 38 corresponding to the processing steps or actions that are taken in order to apply the rule (e.g., a setting to be performed, corresponding track, etc.). For example, one or more 'insert' processors (e.g., high-pass filter, compressor, equalizer, among others) can be used to replace the audio of the track specified in the tags part with a processed version, based on the parameters specified in the rule actions 38. An insert processor refers to any audio processor that is inserted into the signal path of a track or bus, with an input from a previous processor (or source) and an output to the following processor (or master bus, or audio output, etc.) It may be noted that insert processors differ from 'send effect' processors, wherein a particular track is routed to a processor to apply an effect without disrupting the track's signal chain, e.g. to also perform insert processing. It can be appreciated that these principles can equally be applied to "send effect" processors.

The use of insert processors may be done immediately upon reading the static semantic rule 32. The level and pan metadata manipulated by the static semantic rules 32, on the other hand, may not be applied until the mixdown stage (described in greater detail below), after all the static semantic rules 32 have been read. The rule actions 38 can also contain other program instructions or code, such as conditional statements, loops, or calculations. Audio and metadata corresponding to the processed track, as well as other tracks, can be accessed from within the static semantic rule 32.

The static semantic rule 32 may also include comments 40 to allow the actions 38 associated with the static semantic rule 32 to be displayed or otherwise output, and to facilitate debugging. It can be appreciated that a static semantic rule 32 can reference multiple tracks, which can be implemented in various ways, e.g., as follows.

In one example, the rule's tags 36 may include several instruments, e.g. both 'kick drum' and 'bass guitar'. By scanning the tracks to see which static semantic rule 32 should be applied, the system may encounter the kick drum first and, as such, that static semantic rule 32 (e.g., limit panning value to be between −5%-%5) is applied to the kick drum. Upon encountering the bass guitar, the static semantic rule 32 would then be applied to the bass guitar.

In another example, an instrument can be referenced in the rule actions 38 portion of the static semantic rule 32. For example, the static semantic rule 32 can be applicable to bass guitar ('bass guitar' is featured in the rule's tags 36), and the rule action 38 can be, for example: "if kick drum present, put equalizer on bass guitar at 100 Hz, gain −3 dB, quality factor 2.2". In this case, the kick drum track is referenced, and thus there is a 'cross-correlation' between instruments within a static semantic rule 32. More advanced static semantic rules 32 could look at the features or applied parameters of other rules (i.e. vocal equalizer in function of backing vocal panning parameters, or in function of piano spectrum). An example of a static semantic rule 32 is as follows:
tags: authorX, kick drum, pop, rock, compressor
rule actions: ratio=4.6; knee=0; atime=50; rtime=1000; threshold=ch{track}.peak−12.5;
comments: punchy kick drum compression.

It can be appreciated that the static semantic rules 32 can be generated into various suitable data structure or data model. It can also be appreciated that the use of Audio Effects Ontology may facilitate exchanging, editing and expanding the rule database 28, and enable use in description logic contexts.

Figure 6:
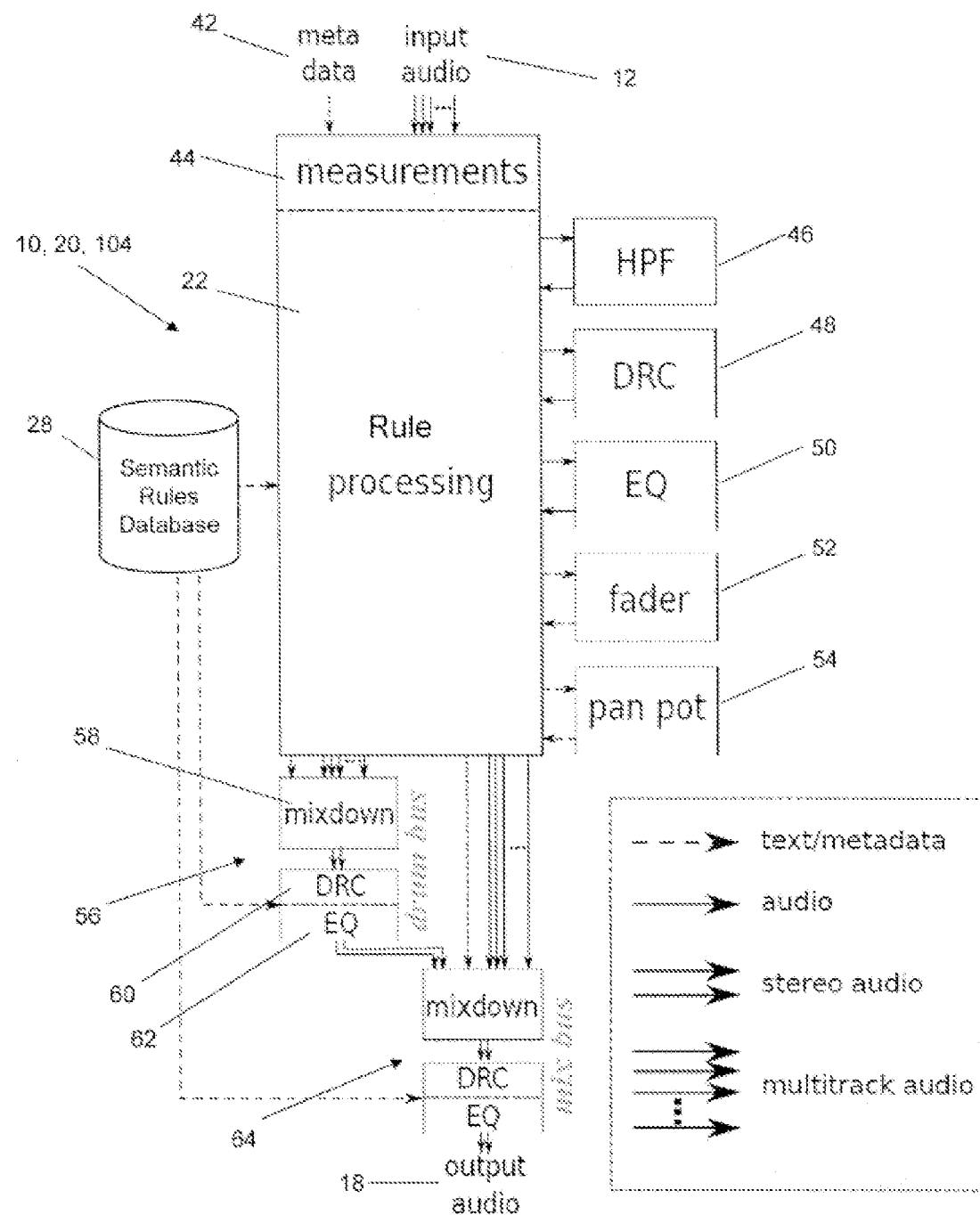
FIG. 6 is a block diagram illustrating an example integration of a semantic processing module with an audio mixing engine.

FIG. 6 illustrates a block diagram of an example of a configuration of the production system 10, semantic processing module 20 and autonomous mixing engine 104 for performing semantic mixing. The inputs in this example comprise raw, multi-track audio 12 (e.g., a mixture of mono and stereo tracks), and metadata 42 (e.g., a text file specifying the instrument corresponding with every audio file, such as: {BassDI.wav, bass guitar}, {Kick D112.wav, kick drum}, {SnareSM57top.wav, snare drum}, {Johnny way, lead vocal}, etc.). Prior to being processed based on the semantic rules 32, elementary features of each track are extracted at a measurement block 44. Measurements can be used to update the metadata 42, and the metadata 42 used by the rule processor 22 to identify appropriate semantic rules 32. In one example, the track number can be automatically stored as an integer or integer array named after the instrument (e.g. if channel 1 is a kick drum: kickdrum=1, if channels 3 through 5 are toms: tom=[3, 4, 5]). The different track indices can also be stored in subgroup arrays (e.g. drums g=[1, 2, 3, 4, 5, 7, 12]) to be able to access all guitars, vocals, etc. at once.

The semantic rules 32 are then read from the rule database 28 and, if applicable, applied to the respective input tracks 12. As discussed above, each semantic rule 32 specifies the nature of the processing to be performed and, in this example, specifies one out of five compressors: high pass filtering ('HPF') 46, dynamic range compression ('DRC') 48, equalization ('EQ') 50, balance/level ('fader') 52 and panning ('pan pot') 54. The order of the application of the semantic rules 32 is determined by the chosen order of the processors. For example, first the knowledge base can be scanned for semantic rules 32 related to processor 1, then processor 2 and so on. It can be appreciated that the use of five processors is purely illustrative and the principles described herein may be implemented using any suitable audio effect or audio processor. Similarly, parameters may be set based on semantic information for insert effects, send effects, and pre-processing (i.e. offline in another wave-editor or processing device).

After processing the individual tracks 12, a drum bus stage 56 may be performed in which the drum instruments (members of subgroup "drums") are mixed down in a first mixdown operation 58 using the respective fader and panning constants, and equalized at 62 and compressed at 60 if there are semantic rules 32 related to the drum bus stage 56. The resultant stereo drum bus output is then mixed down together with the remaining tracks at a mix bus stage 64, again with their respective fader and panning constants. The resulting mix is equalized and compressed if there are semantic rules 32 acting on the mix bus 64, and the stereo output 18 provided.

While in FIG. 6 the input audio file 12 comprises a plurality of input audio signals or input tracks to be processed and mixed together, it should be understood that the input audio file 12 may comprise a single input audio signal or track. In this case, the mixdown operations such as mixdown operation 58 are omitted.

At this point, both the extracted features and the mixing parameters are constant over the whole of the audio track. In another embodiment, the extracted features and mixing parameters can be determined for different parts of the audio track, after manual or automatic segmentation, and so may have measures or settings that vary substantially continuously over time.

The order of processing can vary according to application and as new techniques and research is conducted, however, it has been found that, in one embodiment, the preferred order should be based on workflow considerations. In some cases, at least one equalizer stage 50 is desired before the compressor 48, because an undesirably heavy low end or a salient frequency triggers the compressor 48 in a way different from the desired effect. In the example herein discussed, it is assumed and ensured that the signal being evaluated has no such spectral anomalies that significantly affect the working of the compressor 48 (e.g., as confirmed by a short test). Instead, a high-pass filter 46 can be placed before the compressor 48 to prevent the compressor 48 from being triggered by unwanted low frequency noise, and an equalizer 50 after the compressor 48, as illustrated in FIG. 6.

It is widely accepted that the faders 52 and pan pots 54 should manipulate the signal after the insert processors such as compressors 48 and equalizers 50, and as shown in FIG. 6, the pan pots 54 can be placed after the faders 52 to be consistent with how mixing consoles are generally wired. Furthermore, because of the linear nature of these processes and their independence in the semantic processing, the order may be less significant in this context. It may be noted, however, that the semantic mixing system described herein allows for any order of processors.

Based on these considerations, the following order of processors is used for the assessment of the semantic mixing system: high-pass filter 46, dynamic range compressor 48, equalizer 50, fader 52 and pan pot 54 as illustrated in FIG. 4.

In the example described herein, a generic compressor model may be used with a variable threshold layout (as opposed to for example a fixed threshold, variable input gain design), a quadratic knee and the following standard parameters: threshold, ratio, attack and release ('ballistics'), and knee width.

In this example, make-up gain is not used since the levels are set at a later stage by the 'fader' module, which makes manipulating the gain at the compressor stage 48 redundant. For illustrative purposes, in this example, there is also no side-chain filter, a side-chain input for other channels than the processed one, or look-ahead functionality. The compressor processes the incoming audio sample on a sample-by-sample basis. Stereo files (such as an overhead microphone pair) are compressed in 'stereo link' mode, i.e. the levels of both channels are reduced by an equal amount. Various compressor settings for various instruments and various desired effects can be chosen, according to the application and environment and thus the corresponding static semantic rules 32 can vary accordingly.

A second processing step modifies the spectral characteristics of the signal using equalization 50 and filtering 46 of the different tracks 12, or groups of tracks 12. In this example, two tools are used to accomplish this task: a high pass filter 46 (e.g., implementing actions such as high pass filtering with a cut-off frequency of 100 Hz on every track but the bass guitar and kick drum), and a parametric equalizer 50 (e.g., with high shelving, low shelving and peak modes). It can be appreciated, however, that a number of tools that affect the spectral characteristics of the sound, such as equalizers and other filters as exemplified above, can be used. The parameters for the latter are frequency, gain, and Q (quality factor). A simple biquadratic implementation may be used for both the high-pass filter 46 (e.g., 12 dB/octave) and the equalizer 50 (e.g., second order filter per stage, i.e. one for every frequency/Q/gain triplet).

When attempting to translate equalization rules into quantifiable mix actions, one can map portions of the frequency spectrum into features that more closely describe the objectives of the production task, e.g. timbre features such as 'airy', 'muddy' and 'harsh' that may be related to portions of the frequency spectrum. This is possible because many prior art sources provide tables or graphs that define these types of mappings.

The panning value is stored in the metadata 42 for each track 12 and in this example is initially set to zero. The value ranges from −1 (panned completely to the left) to +1 (panned completely to the right), and determines the relative gain of the track during mixdown in the left versus the right channel.

Similar to the panning stage 54, the fader 52 or 'gain' variable per instrument can be stored as metadata 42 with the track 12. The initial gain value may be set to 0 dB, and then may be manipulated according to the rules 32 (e.g., in absolute or relative terms, i.e. 'set gain at x dB' or 'increase/decrease gain by x dB') and applied during mixdown 58. Alternatively the output 'level' could be defined per instrument and stored as metadata 42 with the track 12. The system would evaluate the required gain value to achieve the prescribed level, based on the track level of the signal entering the fader 52 (also stored as metadata 42). The former case is an example of a static semantic rule, and the latter is an example of a dynamic semantic rule.

Figure 7:
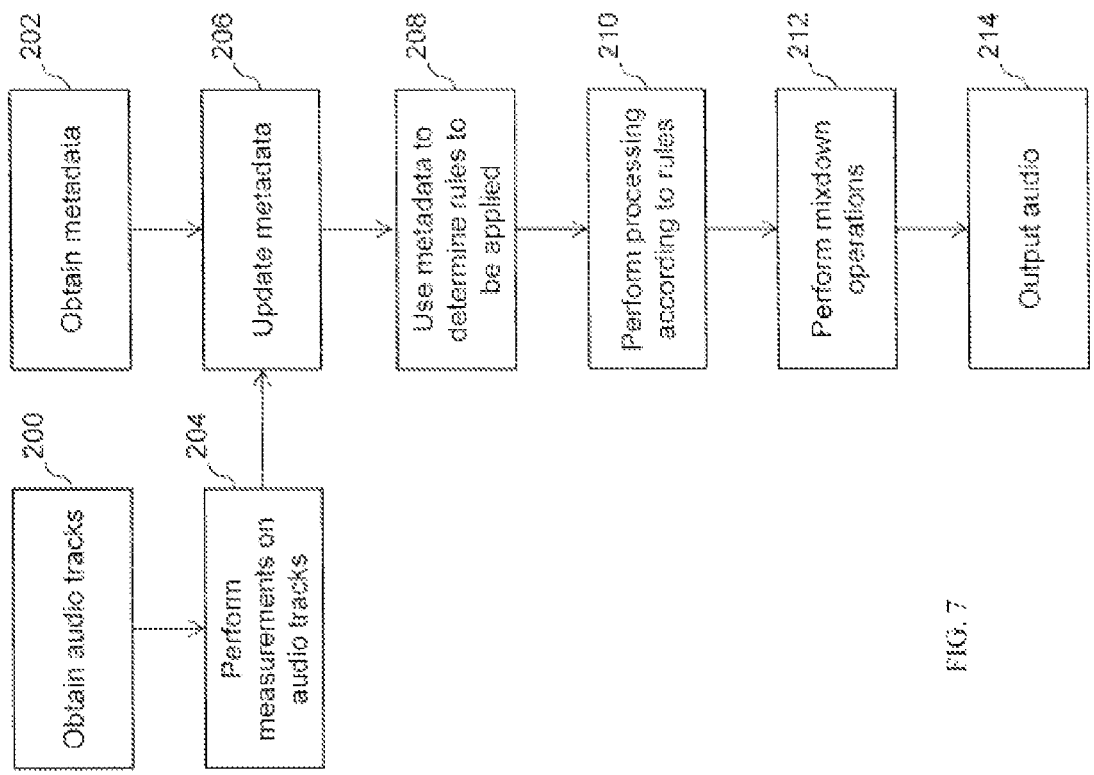
FIG. 7 is a flow chart illustrating example computer executable instructions that may be performed in operating a semantic processing mixing to apply semantic rules to audio data.

Turning now to FIG. 7, an example set of computer executable operations are illustrated that may be executed to perform a semantic mixing process. At step 200, an audio file comprising the audio tracks 12 is obtained and at step 202, the initial metadata 42 (e.g., with instrument, genre, styles, etc. indicated) is obtained. The measurements described above are applied to the audio tracks 12 at step 204 and the metadata 42 is updated at step 206. The metadata 42 may then be used at step 208 to identify tags 36 in the static semantic rules 32 that are appropriate for the track 12 and the corresponding rule actions (processing) can be performed at step 210, according to the static semantic rules 32. The mixdown operations may then be performed, e.g., as discussed above, at step 212, and the final mixdown (after the mix bus stage 64) or audio output 18 is generated at step 214 as an output.

It should be understood that the step of performing a mixdown 212 may be omitted. For example, if the input audio file comprises a single audio signal or track, only the steps 200-210 and 214 are performed.

Figure 8A:
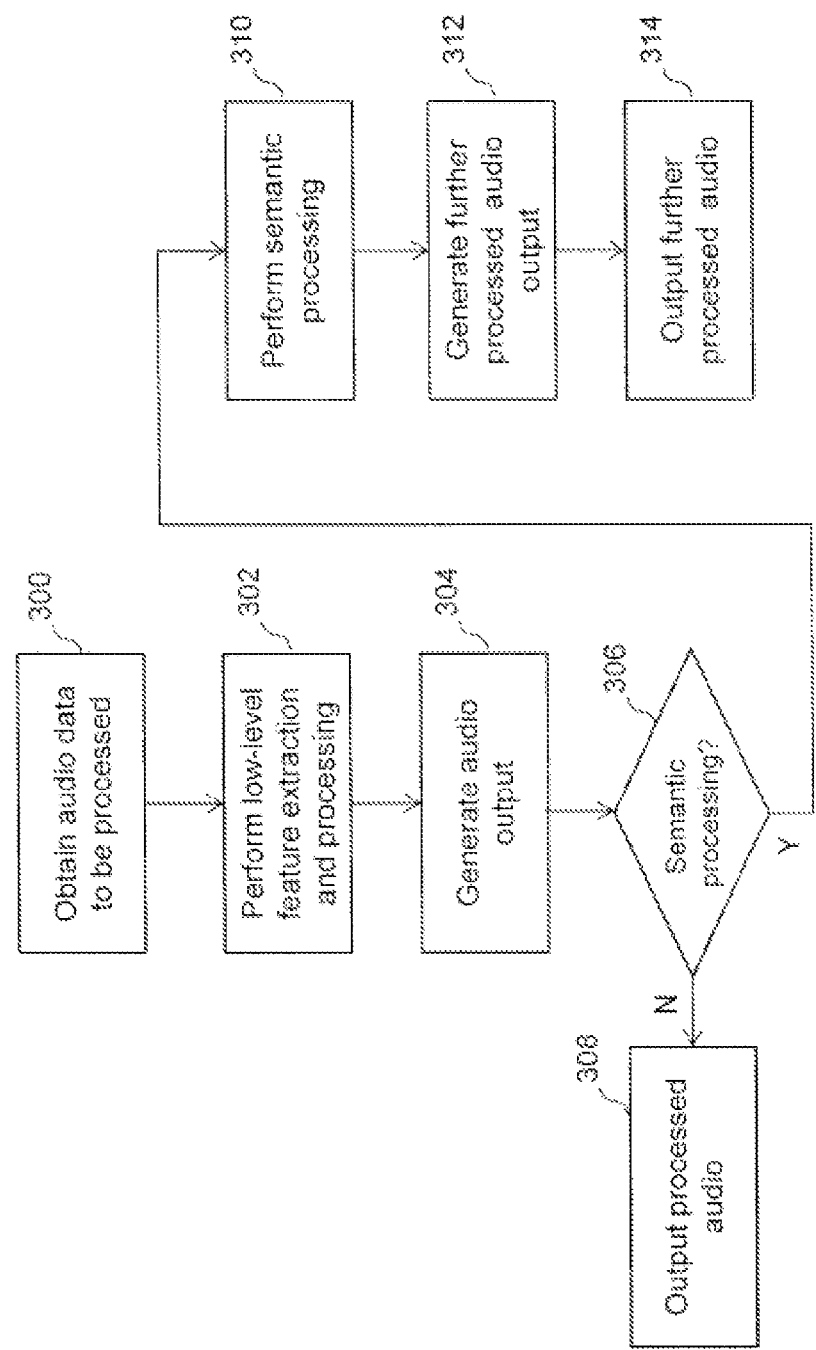

As discussed above, although the semantic mixing operations can be performed in isolation, ideally the semantic mixing is performed in conjunction with processing done according to low-level extracted features. FIG. 8A provides an example set of computer executable operations that may be executed by a production system 10 in order to perform a semantic mixing process in conjunction with other autonomous audio mixing processes (e.g., using cross-adaptive feature processing as exemplified below), wherein the low level processing and semantic mixing are done serially. At step 300 the audio data to be processed is obtained, e.g., the audio tracks 12. The autonomous mixing engine 104 may then be used at step 302 to perform low-level feature extraction and, for example, cross-adaptive processing (as discussed below) to generate an audio output 18 at step 304. This audio output 18 may be the final output if semantic mixing is not performed, or may constitute an intermediate output. The production system 10 would therefore determine at step 306 whether or not semantic processing is to be performed, e.g., based on the presence or absence of metadata 42 and static semantic rules 32. If not, the already processed audio is provided as the audio output 18 at step 308. If semantic processing is to be performed, this is done at step 310 to generate further processed audio at step 312 that can be output at step 314.

It can be appreciated that in some configurations it may be advantageous to take the low-level feature processed version and apply suitable semantic rules to further tweak or adapt the output to instruments, styles, genres, etc., or to prevent or ignore certain low-level adjustments that would normally be performed but which are not appropriate in the current application. In such a configuration, since low level processing would have already occurred (as shown in FIG. 8A) before the high-level semantic processing, any processing to be tweaked, prevented, or ignored, would need to be counteracted. FIG. 8B illustrates a configuration in which, to the extent that the semantic mixing ignores processing that has been done and can be reversed, operations 316 and 318 can be performed to determine if any processing is to be counteracted at step 316 and apply post processing to reverse one or more previously applied processes at step 318, prior to outputting the further processed audio at step 314.

Figure 8C:
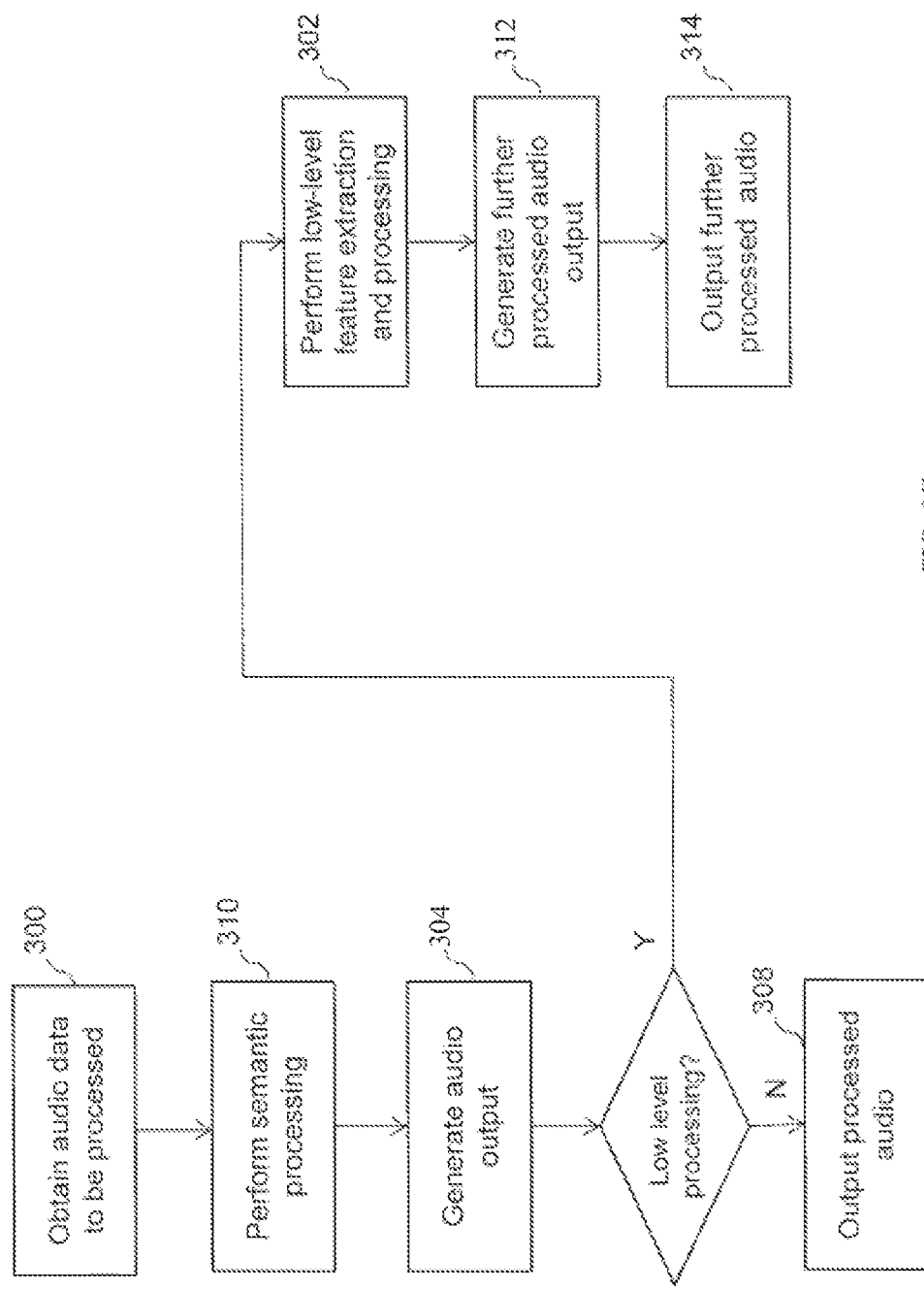

In another configuration shown in FIG. 8C, the same operations shown in FIG. 8A are performed, however, the low-level and semantic processing stages are reversed such that a semantic analysis is performed and any results are fed into various automatic low-level processors directly to be accounted for during the low-level processing (e.g., to ignore certain processing steps based on the semantic analysis).

It can be appreciated that the configuration shown in FIG. 8C may also be adapted to accommodate a frame-by-frame analysis, when semantic information may change on a frame-by-frame basis rather than being static across all frames. In a frame-by-frame configuration, at the beginning of each frame, the tracks are analyzed to derive classification features (e.g., "is background vocal", "the chorus starts", "is guitar", etc.) and the results are passed to the different processors for performing the low level processing according to static semantic rules 32 pertaining to the classification feature information. An example of a result may include an array of "gain boosts and cuts" based on which instruments are lead instruments, which are background, which can be fed to the "automatic fader" module, etc. The automatic faders then apply typical level changes to bring instruments to the same loudness but apply an additional boost to the lead vocal, an additional cut to the backing vocal, etc. A similar procedure may be applied to other processors being used. It may be noted that the low-level analysis and corresponding processing happens within the different modules in this example.

Figure 8D:
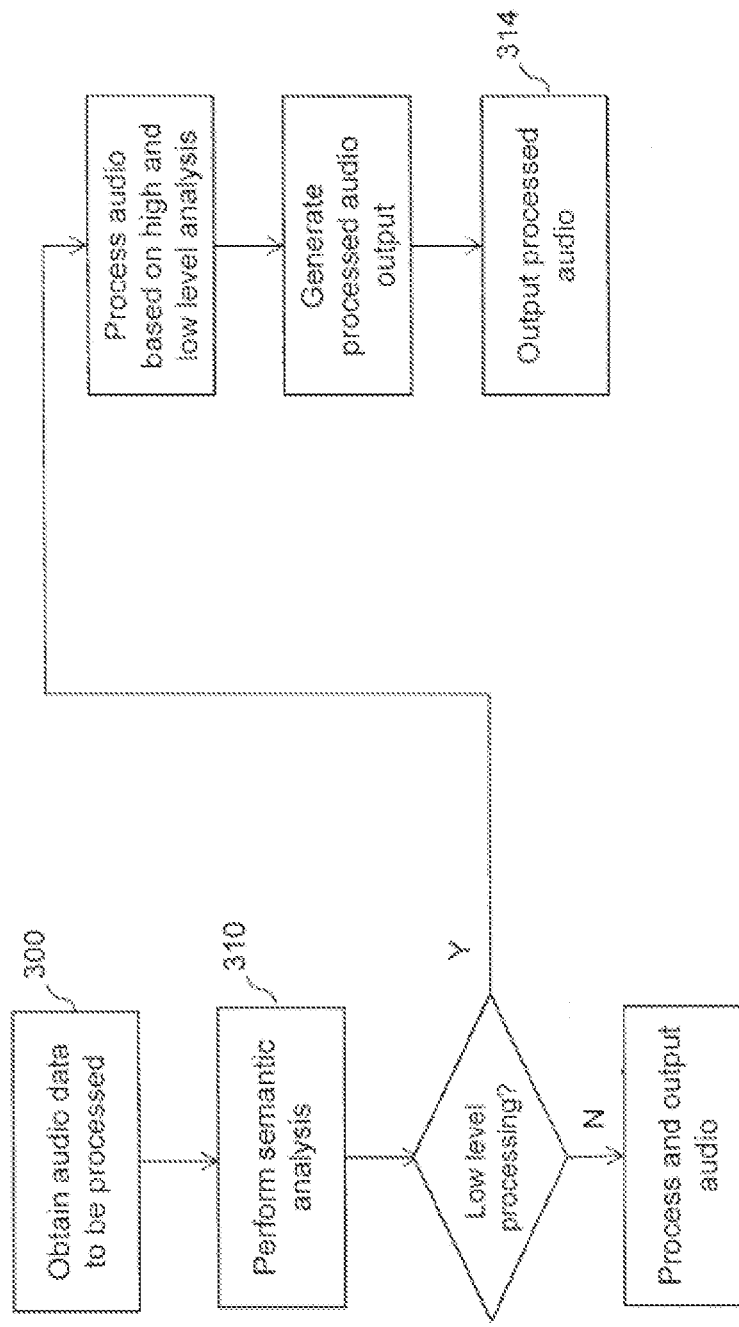

In yet another configuration shown in FIG. 8D, both high and low-level analyses may be performed prior to utilizing any of the processors. In such a configuration, the analysis is decoupled from the processing to allow the high level processing to modify or enhance (or remove) certain low level processing to account for instrument, genre, or style-based considerations (to name a few). The processors may then be configured to receive parameters from an analysis stage and be concerned with processing.

It can also be appreciated that the system may incorporate delay-based effects such as reverberation and delay.

Figure 9:
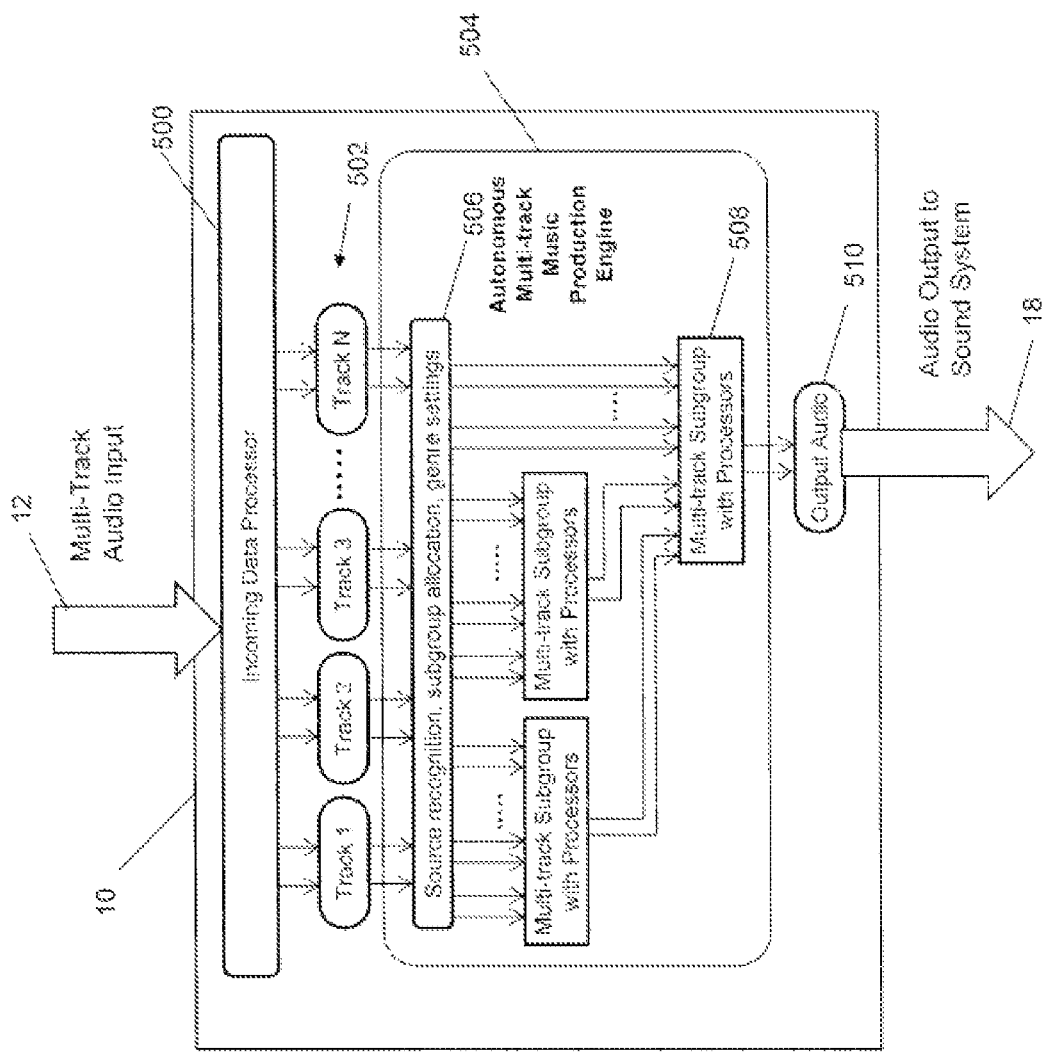
FIG. 9 is a block diagram illustrating an autonomous multi-track music production system having a semantic processing module.

FIG. 9 illustrates further detail for an example production system 10 having a semantic processing module 20, which may be implemented using program instructions or modules within the system 10. The production system 10 includes an incoming data processor 500 for receiving a multi-track audio input 12, e.g., streaming data or a data file and output tracks 502 to be processed. The data file processor 500 processes its input to effectively provide an "audio source" to be input to an autonomous multi-track music production engine 504 (the "engine 504" hereinafter). The engine 504 includes a source control block 506 to perform source recognition and other types of semantic or high-level mixing (e.g. by utilizing a semantic processing module 20—not shown in FIG. 9), subgroup allocation and genre settings. Source recognition uses machine learning and feature extraction methods to automatically determine the audio source type or instrument. This information can then be used to divide the tracks into subgroups, for example a vocal or percussion subgroup, to form the audio production system. Subgroup allocation and routing can also be controlled externally by the user, and will ultimately feed into a final 'main' subgroup that outputs the finished stereo mix. Genre settings are also determined by source detection or by user control. This allows each subgroup and the processors contained within to have different parameter settings and pre-sets, depending on the choice or detection of genre. In the typical example shown in FIG. 9, the signals are separated into multiple multi-track subgroups 508 which output the final mixed audio at 510.

The designation of sub-groups can be achieved automatically using source recognition, such as vocal and percussion detection techniques, or manually based on descriptors or tagging entered by the user(s). The automatic detection techniques are based on machine learning algorithms on numerous low and high-level extracted audio features, and incoming tracks are analyzed in real time and can be judged by their relation to the results of off-line machine learning analysis. Another feature of sub-grouping is the sharing of extracted features between processors, to prevent repeated calculation of extracted features and thus improve efficiency. Additionally, the engine 504 may include an active learning module or related functionality to implement machine learning techniques that adapt to new data input from the user.

The semantic mixing module 20 is integrated with the production system 10 such that it can interface with the output of the engine 504 to provide further enhancements and adjustments to adapt to semantic inputs as discussed above.

Although not shown in FIG. 9, the production system 10 may also include or provide functionality for an offline analyzer, which may be integrated into the production system 10 to enable a user to conduct offline analyses of audio data. The offline analyzer may be separate from or a component of the system. The offline analyzer contains time stamps of the audio data being analyzed, along with associated data points. The offline analyzer may be configured to generate new long-term extracted features, e.g., for features that require accumulated data over time, different measures using the same extracted features, etc., and that were previously unavailable, such as loudness range, to use in the signal processing algorithms relied upon by the production system 10. For example, locating changes in a song's dynamics using long term measures of loudness, crest factor, etc. can be performed to generate a new extracted feature.

The offline analyzer may also perform instrument recognition by analyzing each whole track, and then using that knowledge to build the subgroups 508 before running the mix. Previously, real time systems would need some buffering to analyze the incoming audio before being able to generate subgroups 508.

The offline analyzer may also be used to generate data points by running the audio through the pre-existing feature extraction and cross-adaptive analysis stages of the subgroups 508 (see also FIGS. 10-12), and returning the data for storage in, for example, the offline analyzer or in a block or module accessible to the offline analyzer.

The offline analyzer may also communicate with the source control block 506, which in turn, communicates with the subgroups 508, in order to set parameters of the mix at the appropriate times.

An offline analysis example will now be described. In this example, a set of multi-track audio files (also known as stems) are made available to the engine 504. The stems are analyzed frame by frame, and audio features (such as Loudness, Spectral Centroid, Crest Factor) are extracted, with values for each stored as a feature time-series. An analysis stage is then run to monitor variations in feature values, within individual tracks and across all tracks, and to adjust the engine 504 accordingly. For example, with loudness as the chosen extracted feature, the offline analyzer may notice that all tracks suddenly become significantly less loud and one track, e.g. an electric guitar, continues at its original level. This is maintained for a period of time (e.g., 20 seconds) before the tracks all return to their original loudness state. This is interpreted by the offline analyzer as a solo section, and would affect the engine 504 in a number of ways: i) the guitar is selected as a lead track and is panned to the center of the mix, ii) the guitar fader level is boosted (e.g., by 3 dB), and iii) the smoothing function of the guitar fader is bypassed at the start of this section to allow the fader to jump and give the guitar immediate prominence in the mix. These parameter changes are stored as data points against time by the offline analyzer.

Next, the mix can be processed, following the usual signal processing algorithms present in the real time implementation, but with various parameters changed at the points in time corresponding with events discovered in the analysis stage.

It can be appreciated that there are numerous other examples and possibilities that offline analysis, and the knowledge of future audio events that we gain as a result, would have on the engine 504. For example, a dynamic rule describing the overall target frequency spectrum may be enforced by selecting and optimizing an equalizer to push the output frequency spectrum towards the target. The frequency content of the individual tracks, or the final mix-down, can be monitored frame by frame. The filters can then be pre-emptively controlled to adjust to changes in the spectrum that are about to occur, rather than reacting afterwards. The same theory applies for any processing tool, i.e. they can be made to react before the event.

It can also be appreciated that the above-noted principles concerning the offline analyzer can be achieved in quasi-real-time using a look-ahead buffer, which allows pre-emptive knowledge of upcoming events without requiring the full audio files to be available.

Although a particular example configuration for the production system 10 is shown in FIG. 9, it can be appreciated that various system configurations can be achieved using the principles described above, e.g. by adapting the structure in FIG. 12 (see below) in multiple flexible ways to create processors 522-528 (e.g. faders, compression, etc.) and subgroup 508 placements that adapt to a particular application. For example, the stages shown in FIG. 19 can be reconfigured to be in different orders, quantities and routing. As such, it can be appreciated that the examples shown herein are illustrative only.

When combined, the production system 10 continuously adapts to produce a balanced mix, with the intent to maximize panning as far as possible up to the limits determined by each track's spectral centroid. All parameters, including the final pan controls are passed through EMA filters to ensure that they vary smoothly. Lead track(s), typically vocals, can be selected to bypass the panning algorithm and be fixed in the centre of the mix.

Figure 10:
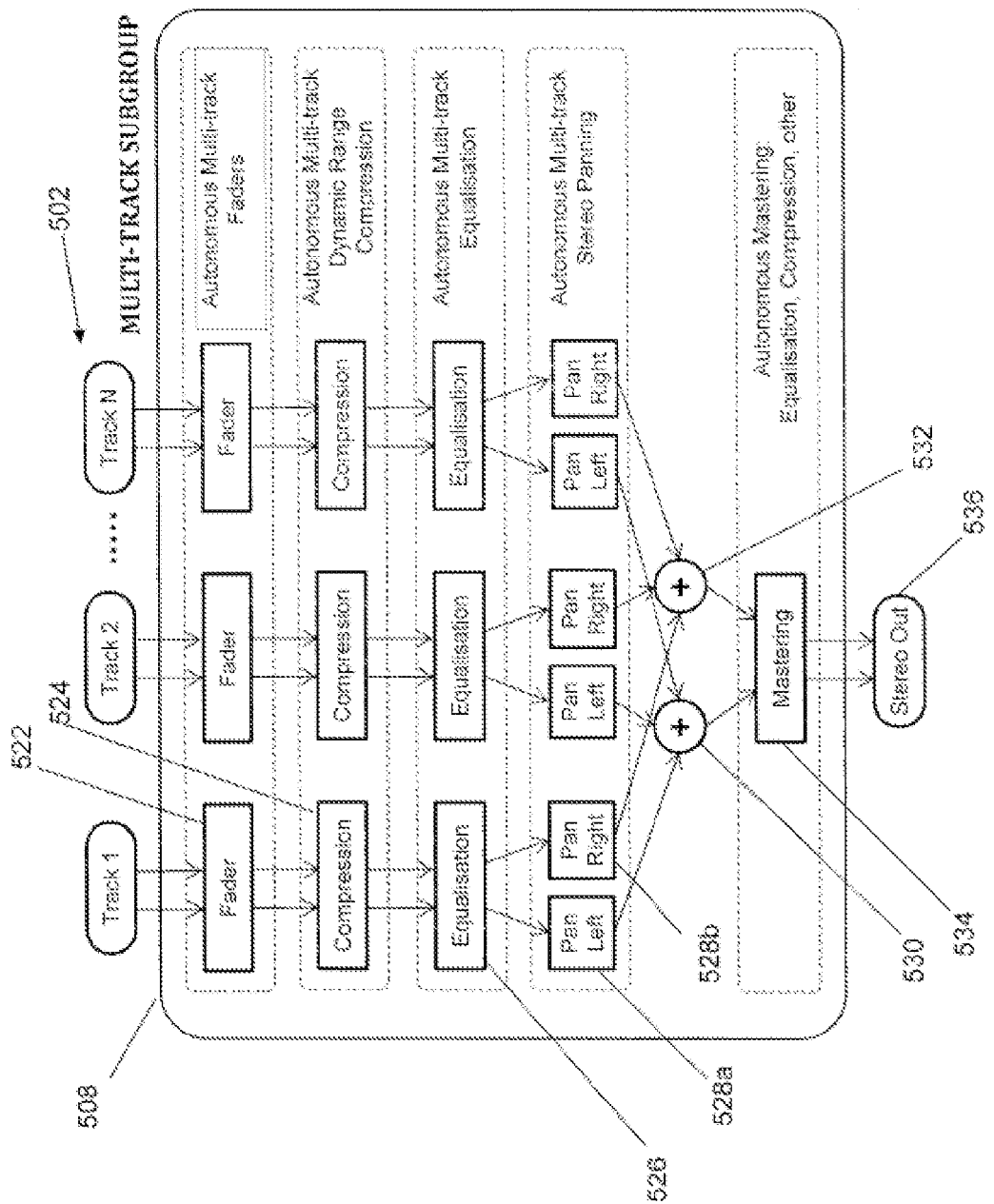
FIG. 10 is a block diagram illustrating a multi-track subgroup for an autonomous multi-track music production system.

FIG. 10 illustrates an example of a configuration for a multi-track subgroup 508 which performs the processing and mixing as a series operation for autonomous, real-time, low latency multi-track audio production. Each track 502 is received by the multi-track subgroup 508 and firstly undergoes loudness processing in a loudness processing module that includes a loudness processor 522 for each individual track, and performs the actual processing of the loudness characteristics of the associated track.

The tracks 502 are then processed by respective compression processors 524 associated with each track, and then by respective equalization (EQ) processors 526 to apply a sequence of filters to alter the frequency content of a track. The processed audio signals corresponding to each of the tracks 502 are then processed by respective left and right stereo panning processors 528a/528b. The left and right signals are then combined at 530 and 532 respectively and are processed by a mastering module 534 to be output at 538 by the subgroup 508 and eventually the production system 10.

Figure 11:
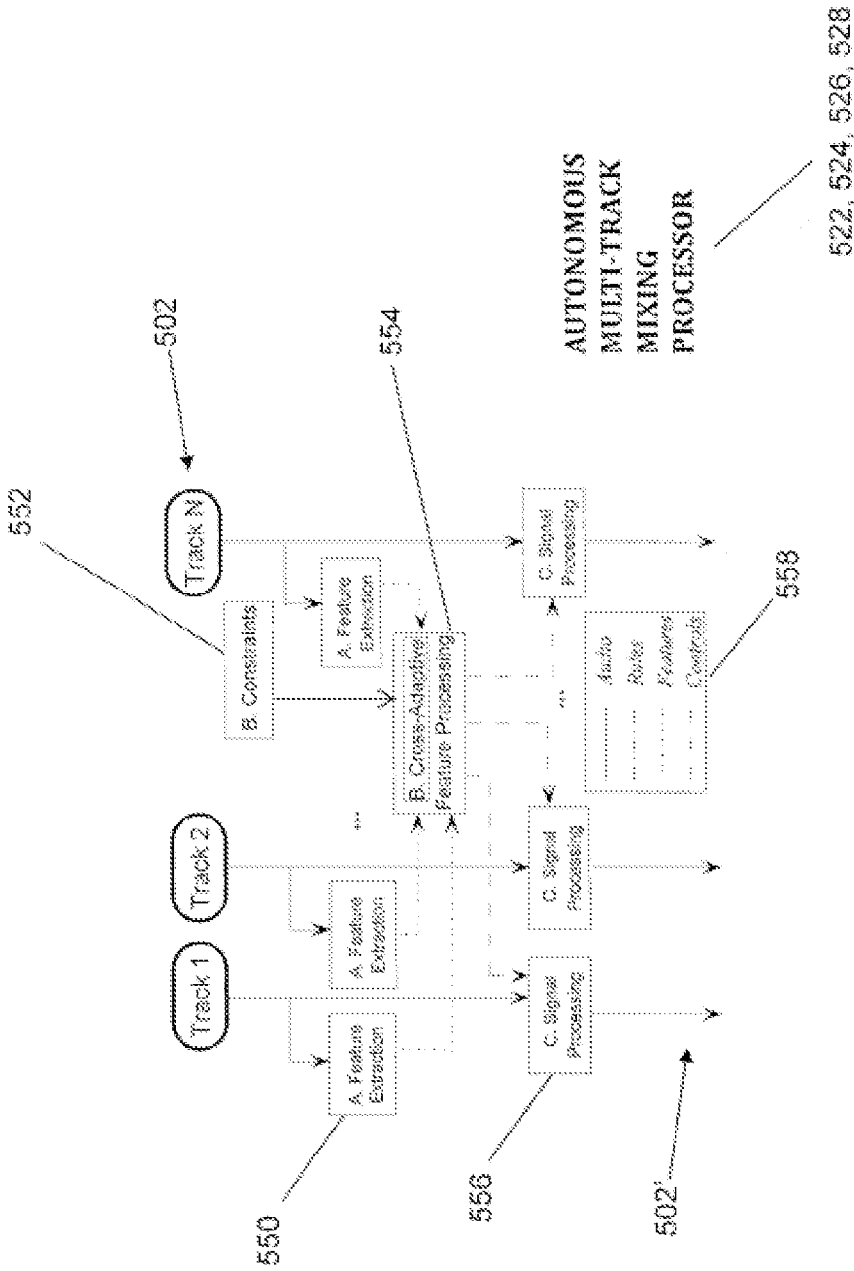
FIG. 11 is a block diagram illustrating a cross adaptive feature processing element for an autonomous multi-track music production system.

A generic illustration of a processor 522, 524, 526, 528 used in the production engine 504 is shown in FIG. 10, which is arranged to automatically produce mixed audio content 502' from multi-track audio input content 502. The processor 522, 524, 526, 528 shown in FIG. 11 is arranged to perform the automated audio mixing by carrying out the following steps:

Receive input signals 502: digital audio signals 502 from multiple tracks are received at an input of the production system 10 and routed to multiple parallel signal processing channels of the production system 10;

Feature extraction 550: each of the digital audio signals 502 is analyzed and specific features of each of the digital audio signals are extracted;

Feature Analysis (cross-adaptive feature processing module 554): the extracted features and the relationship between extracted features of different signals are analyzed and, in accordance with one or more processing control rules 558, the processing required for each track is determined;

Signal Processing 556: The audio signals are then processed in accordance with the feature analysis; and Output processed signals 502': the processed signals 502' are then output as modified digital audio signals corresponding to each track.

The automated mixing process, including each of the above-mentioned steps, shall now be described in greater detail making reference to the figures.

An input of the processor 522, 524, 526, 528 is arranged to receive a plurality of stereo digital audio signals 502, in the example shown in FIG. 10, first, second, and third stereo audio signals. Each stereo audio signal 502 corresponds to an audio track to be processed, and has a left channel and a right channel. The input of the processor 522, 524, 526, 528 receives each track as a separate audio signal 502. The processor 522, 524, 526, 528 is arranged to accept any number of input audio tracks; the number of tracks only being limited by the processing capability of the production system 10 and the requirements of the audio to be output.

It can be appreciated that, as noted above, the production system 10 may also use sub-grouping 508 to achieve an optimal mix of the audio signals 502, as shown in FIGS. 9 and 10, as herein described. Individual groups of tracks can be assigned to sub-groups 508, inside which mixing and mastering processors can be placed. Sub-groups 508 can be linked together so that the mix-down or individual tracks from one subgroup 508 act as an input to another. Pre-sets can be used to apply specific settings to sub-groups 508, e.g., for genre-specific or instrument-specific mixes.

In the example shown in FIG. 11, the received audio signals 502 are processed in real-time. Such real-time processing is particularly useful when the received signals 502 are real-time signals recorded live or deriving from streamed content. In such an example, feature extraction 550 is performed on the streaming audio in real-time as the audio is received. The features of the audio to be extracted includes features or characteristics of the audio signal such as gain loudness, loudness range, spectral masking, spatial masking, spectral balance, spatial balance, and others.

The received audio signals are passed into a parallel processing operation or "side-chain", i.e. using the cross-adaptive feature processing module 554 for the extraction and analysis of audio features. A plurality of feature extraction modules 550 provides such parallel feature extraction as shown in FIG. 11.

Instantaneous feature values are extracted by the feature extraction modules 550 on a sample-by-sample or frame-by-frame basis, depending on implementation. In the latter case, frame size is as low as required to ensure real-time operation with minimal latency. Accumulative averaging is applied to features to implement real-time feature estimation, the rate of which adjusts according to frame size and sample rate, which is carried out closely following the latest update of the feature value.

The extracted stream of data indicative of the certain features of an audio signal is smoothed over time using any adequate method. For example, an exponential moving average filter may be used with associated time attack and release constants.

The cross-adaptive multi-track feature processing module 554, shown in FIG. 11, receives each of the features extracted by each of the feature extraction modules 550. The cross-adaptive processing module 554 determines processing control functions which dictate the processing operations to be applied to each of the tracks 502. The processing control functions are also determined based on pre-determined constraints 552 and/or both static and dynamic rules 558, along with the extracted features. The predetermined constraints may be set by a user prior to starting the mixing process and stored in a constraints module 552. The processing rules 558 may set certain required relationships between tracks, or upper/lower limits for specific features. Dynamic rules include, but are not limited to, the following:

For autonomous multi-track faders, all active sources tend towards equal perceived loudness;

For autonomous multi-track stereo positioning, all tracks are positioned such that spatial and spectral balance is maintained;

For autonomous multi-track dynamic range compression, compressors are applied on each track such that variation in loudness range of active sources is minimised;

For autonomous multi-track equalization, filters are applied on each track such that spectral bandwidth of sources does not overlap; and For autonomous delay and polarity correction, delays can be added to each track to synchronize each track to a common reference.

The cross-adaptive feature processing module 554 includes a feedback operation to ensure convergence towards the desired features in the output. That is, the controls produced by the cross-adaptive feature processing block may be analyzed before they are applied. If they fail to produce the desired result within a given tolerance, then the control values are adjusted before they are applied.

The processing control functions take the form of time varying filters, such as gains, delays, and infinite impulse response filters. More specifically, a control vector may be utilized, which is a weighted sum of previous control vectors and a function of the extracted features. In the case of loudness faders, multi-track processing is used to derive a decibel level control for each track. The result of this processing is then converted back to the linear domain, and applied as a time varying gain to each track, as discussed below. Similarly, in the case of autonomous stereo positioning, multi-track processing is used to derive a panning position for each track 502, which is then applied as two gains, producing a left and a right output for stereo positioning.

In the case of autonomous delay and polarity correction, the delays between all tracks 502 and a reference are analyzed, and an artificial delay introduced to synchronize the audio.

Once the above-mentioned control functions have been determined they are used to process each of the tracks in the parallel signal processing modules 556. Each track is then output by the respective processing block 556 as a separate audio signal 502' which has been processed in accordance with the controls determined by the cross-adaptive processing module 554. Each processed signal 502' is then combined by a summation process into a single audio output in the output module 510, 536. The output 502' can be of any suitable format, but in this example, is a stereo output 510, 536.

Typically, the main aspects of audio signals to be mixed include, without limitation: the relative loudness levels of each track on a frame-by-frame basis; the relative loudness of the audio signal over a period of time; equalizer; compression, mastering, the stereo panning of each track (for mixing of stereo audio signals), etc. Hence, the automated feature extraction and processing for each of these aspects of an audio signal (i.e. the dynamic rules) shall now be considered in detail.

Figure 12:
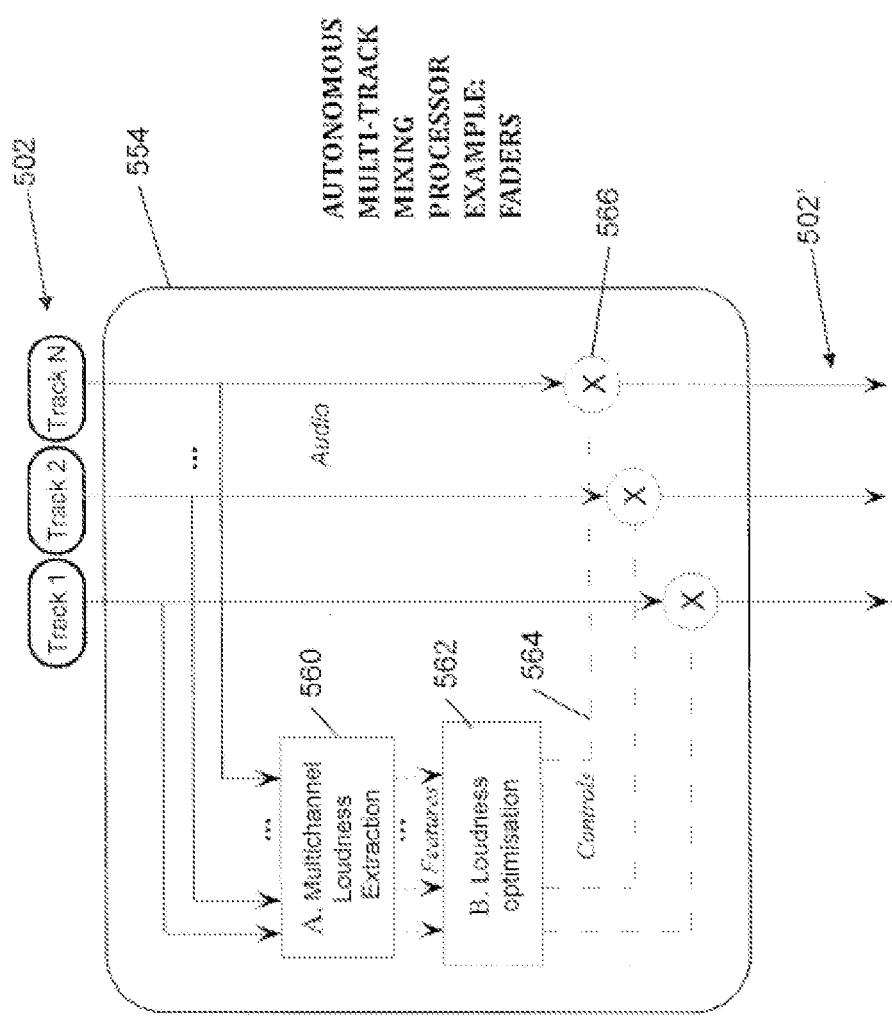
FIG. 12 is a block diagram illustrating an example multi-track mixing processor for an autonomous multi-track music production system.

FIG. 12 shows a multi-track mixing processor 554 that is configured to extract loudness and loudness range to allow for independent control of the relative loudness levels of multiple audio tracks to implement a fader as an example use case. In the example shown in FIG. 9, the feature extraction corresponds to loudness extraction and the cross adaptive processing corresponds to loudness optimization.

As shown in FIG. 12, audio signals 502 corresponding to multiple tracks have information relating to their loudness extracted by a multi-channel loudness extraction module 560 at each sample of frame. The multi-channel loudness extraction module 560 takes the perceptual loudness of all tracks into consideration when determining the associated loudness. A loudness optimization module 562 then determines the control functions to be applied to one or more of the tracks, as appropriate, in accordance with the loudness determination. The tracks to have their loudness altered are then altered by the respective processing modules 566, e.g., by having a gain applied to increase or decrease a signal level according to control signals 564. The output 502' therefore has been processed for loudness correction to enforce the dynamic rule that stipulates their relative loudness.

It can be appreciated that the example configurations shown in FIGS. 9 to 12 are for illustrative purposes only and that various other configurations can be used to adapt to different applications and scenarios.

While FIGS. 3-12 illustrates methods and systems for processing and mixing multiple audio signals/tracks using static semantic rules, the following presents a method and system for analyzing an audio signal to derive static and/or dynamic semantic rules comprising production data to be used to control an autonomous audio production system. The production data comprises a configuration for audio processing tools, input-specific control parameter presets for each of the processing tools, and/or the most suitable production objectives in terms of both aesthetics and functional constraints.

Figure 13:
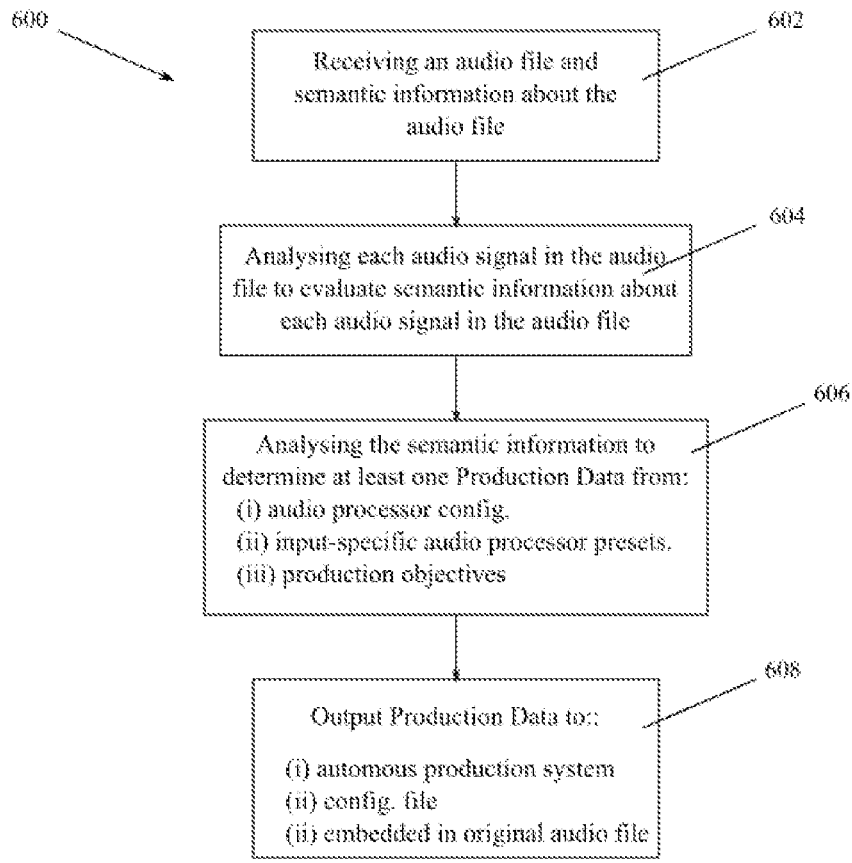
FIG. 13 is a flow chart of a method for determining production data, in accordance with an embodiment.

FIG. 13 illustrates one embodiment of a method 600 for analysing an audio signal or audio signals in order to extract semantic data or information, and using the extracted semantic data to derive production data.

At step 602, an audio file to be analyzed is received along with optional semantic information about the audio file. The audio file may comprise a single audio signal to be analyzed or a plurality of audio signals to be analyzed together. The semantic information about the audio file may be inputted by a user via a user interface and received from the user interface.

At step 604, each audio signal in the audio file is analyzed and semantic data about each audio signal is extracted. In the same or another embodiment, the semantic data about the audio file may come from input via a user interface, extracted from the audio file, or both.

At step 606, the semantic data for the audio file is analyzed to determine at least one corresponding semantic rule. As described above, the semantic rules may comprise at least one static semantic rule and/or at least one dynamic semantic rule. The semantic rules comprise production data which is indicative of the audio processing actions to be performed on the audio file. The production data may be of three different types: data about the configuration for the audio processing actions to be performed such as the temporal sequence in which the processing actions should be performed, characteristics for each audio processing action corresponding to input-specific control parameter presets for each audio processor that will perform a corresponding audio processing action, and production objectives taking the form of desired target values for given features of the audio file. The configuration and characteristics of the audio processing actions may be seen as static semantic rules while the production objectives may be considered as dynamic semantic rules.

At step 608, the production data is output. In one embodiment, the production data is sent to an autonomous audio production system that will process the audio file according to the production data. In another embodiment, the production data is output as a separate configuration file to be stored in memory. In still another embodiment, the production data is embedded within the original audio file that may be stored in memory.

Figure 14:
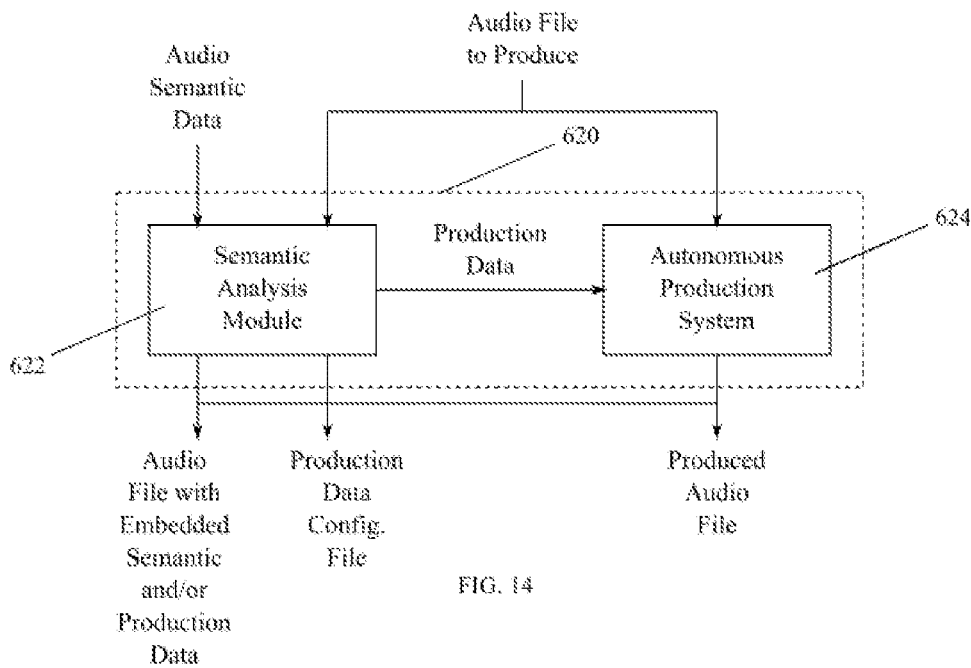
FIG. 14 is a block diagram of a system for determining production data, in accordance with an embodiment.

FIG. 14 illustrates one embodiment of a system 620 for performing autonomous audio production according to at least item of production data. The system 620 comprises a semantic analysis module 622 and a separate autonomous audio production system 624. The semantic analysis module 622 receives the audio file to be processed, and optionally semantic data related to the audio file from a user interface. The audio file to be produced may comprise a single audio signal, or a plurality of audio signals to be analyzed and produced together. The semantic analysis module 622 is adapted to determine semantic information or data from the received audio file and the semantic data are sent to the autonomous audio production system 624. In one embodiment the semantic analysis module 622 may save the production data in a configuration file. In another embodiment the semantic analysis module 622 may embed the semantic and/or production data in the audio file to be processed.

The autonomous production system 624 receives the audio file to be processed and the production data. As described above, the production data is indicative of: a configuration for audio processors, control parameters or input-specific control parameter presets for the audio processors, and/or target values for given production features of the audio signal. Using the production data, the autonomous production system 624 performs at least one of the following: configure the audio processors or processing tools to be used within the autonomous production system 624, set input-specific control parameter presets on each of the processing tools, and set control parameters on each of the processing tools such that the production features of the produced audio file match the target values contained in the production data. The autonomous production system 624 then processes the received audio file, and outputs the processed or produced audio file. In one embodiment, the autonomous production system 624 is further adapted to embed the semantic and/or production data in the produced audio file.

Figure 15:
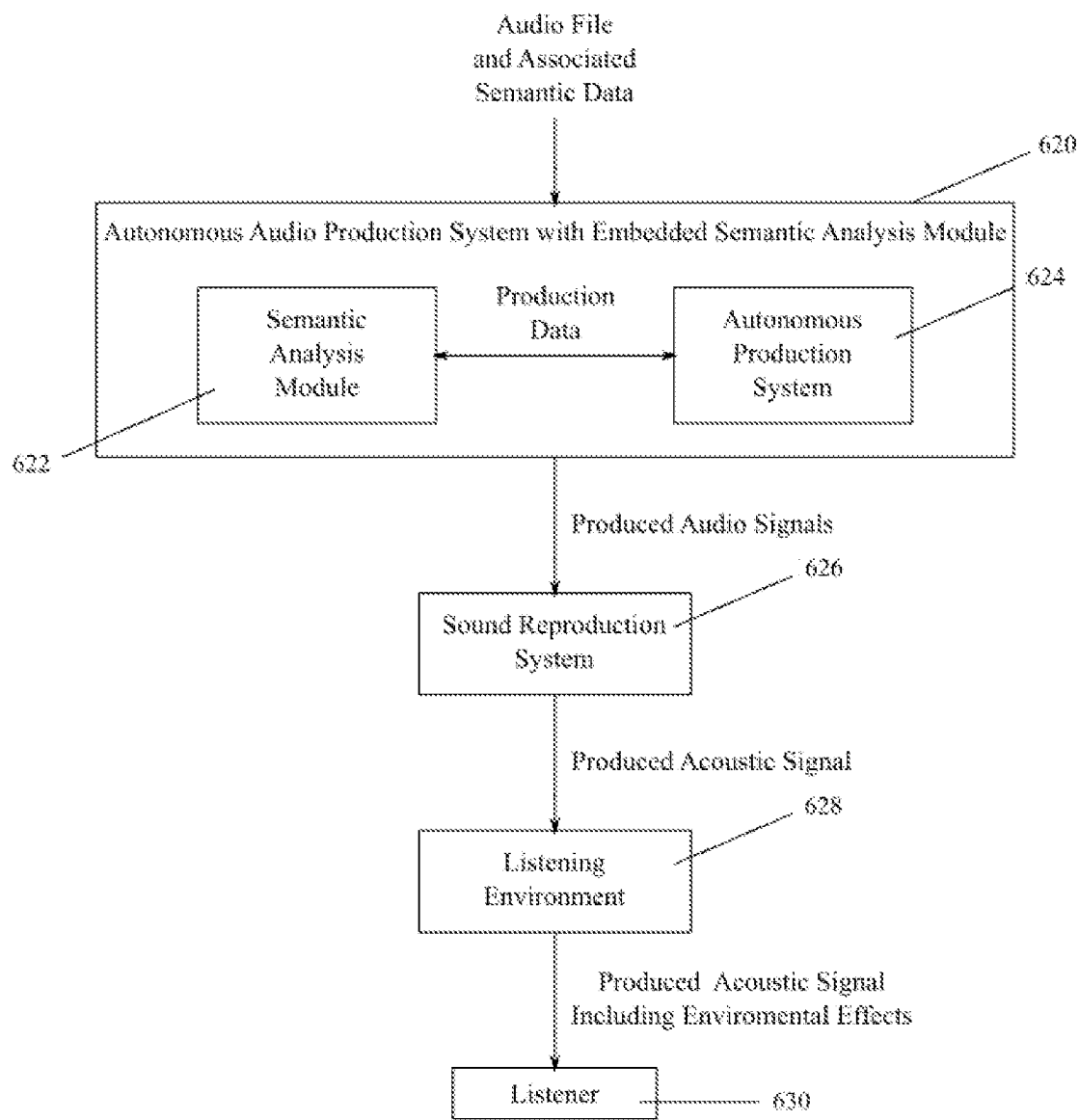
FIG. 15 is a block diagram of an autonomous audio production system comprising an embedded semantic analysis module, in accordance with an embodiment.

FIG. 15 illustrates one embodiment of the system for processing and listening to an audio file whereby the semantic analysis module 622 is combined with an autonomous production system 624, and are embedded within a semantic-based autonomous audio production system 620 (referred to as the "production system" hereinafter). The production system 620 takes an audio file or signal as input, which is processed by the autonomous production system 624 based on production data derived by the semantic analysis module 622. The production system outputs at least one produced audio signal, which is sent to a sound reproduction system 626 that converts them into at least one produced acoustic signal. The produced acoustic signal is then subject to the effects of the listening environment 628, e.g. room acoustic effects and background noise, to give the final produced acoustic signal including environmental effects that is heard by the listener 630.

Figure 16:
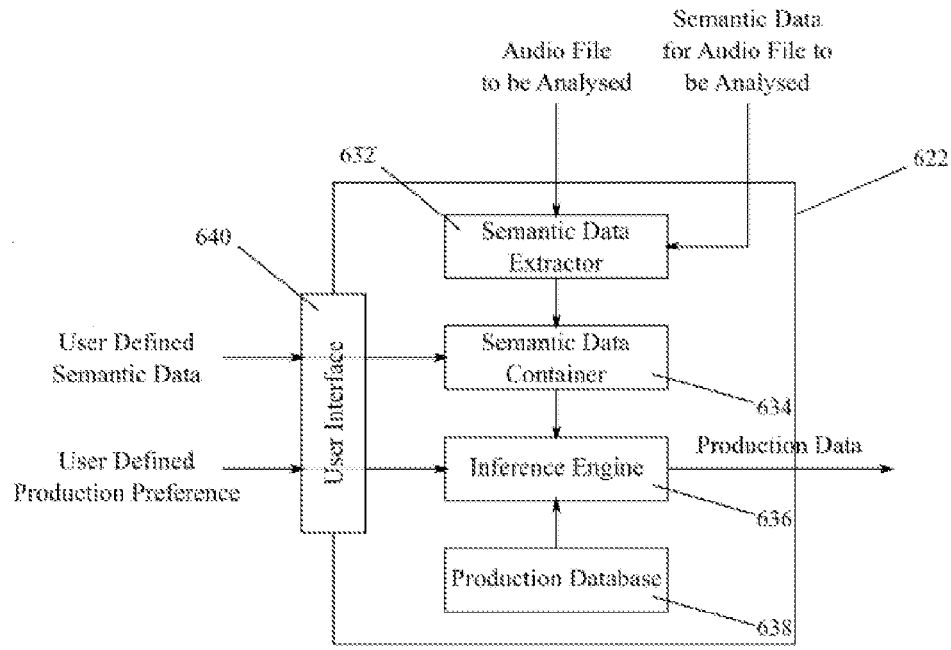
FIG. 16 is a block diagram of a semantic analysis module, in accordance with an embodiment.

FIG. 16 illustrates one example of a configuration for the semantic analysis module 622. It can be appreciated that the functional blocks shown in FIG. 16 are purely illustrative. The semantic analysis module 622 comprises a semantic data extractor 632, a semantic data container 634, an inference engine 636, and a production database 638. The semantic data extractor 632 is adapted to receive the audio file to be processed and extract semantic data from the received audio file. The semantic data container 634 is adapted to receive the extracted semantic data from the semantic data extractor 632, and optionally additional semantic data relative to the audio file from a user interface 640. The semantic data container 634 is adapted to combine the received semantic data into a single set of semantic data that is transmitted to the inference engine 636. Semantic data relating to the audio file to be analyzed may also be passed to the semantic data extractor 632. The production database 638 contains a body of example production data for produced audio files. The inference engine 636 receives semantic data for the audio file to be analyzed from the semantic data container 634, and accesses the production database 24 to determine suitable production data to produce the audio file to be analyzed. In one embodiment, the user inputs production preference via the user interface 640, which will influence the determination of production data by the inference engine 636.

Figure 17:
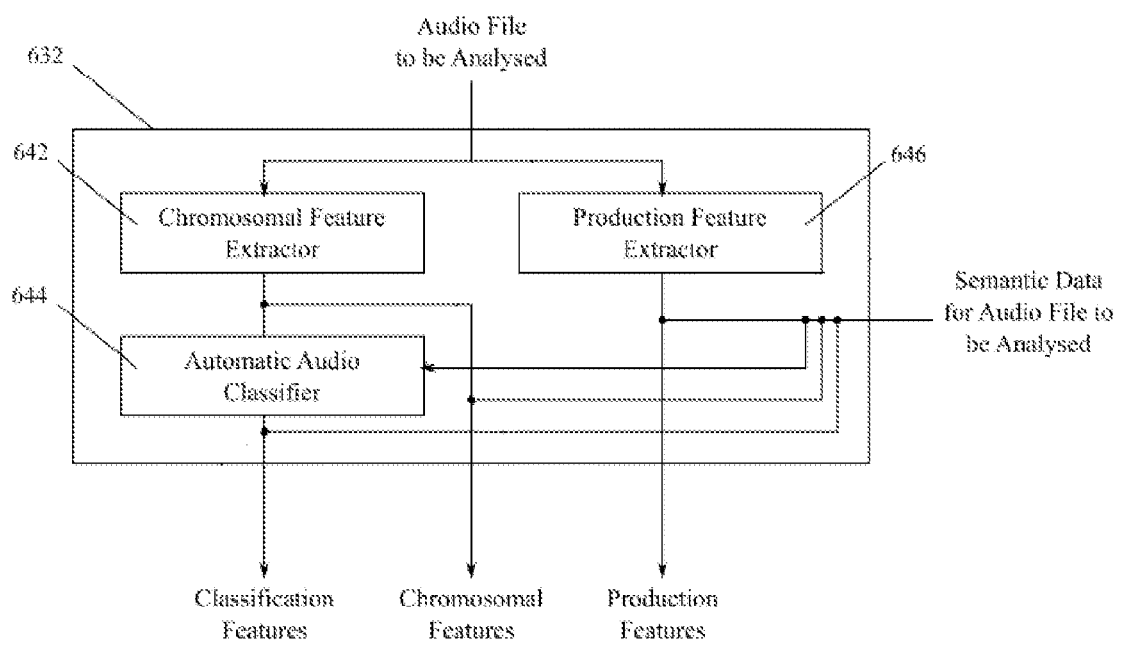
FIG. 17 is a block diagram illustrating a semantic data extractor, in accordance with an embodiment.

FIG. 17 illustrates one embodiment of the semantic data extractor 632. In this embodiment, the semantic data extractor 632 comprises a chromosomal feature extractor 642, an automatic audio classifier 644, and a production feature extractor 646. The chromosomal feature extractor 642 receives the audio file and evaluates the chromosomal features of the audio file to be analyzed. Chromosomal features include any numerical features that may be used to describe the audio file to be analyzed, e.g. tempo, harmonic content, Mel-Frequency Cepstral Coefficients (MFCCs), Sub-Band Flux (SBF), and/or features from the Music Information Retreival (MIR) literature. The chromosomal features may further include any statistical measures of time-series of the numerical features, e.g. mean, variance, skewness, kurtosis, median, mode, maximum, minimum, derivative, integral, sum, etc. These may relate to the entirety of each audio signal in the audio file to be analyzed, or only regions thereof.

The automatic audio classifier 644 uses the chromosomal features to classify the audio file to be analyzed to determine its classification features. Classification features include any categorical features that may be used to describe the audio file to be analyzed, e.g. genre, instrumentation, artist; and any categorical description of the production objectives, e.g. production style (year or specific producer for example), emotive context, etc. Classification may be performed using any adequate machine learning techniques such as Support Vector Machines (SVMs).

The production feature extractor 646 evaluates the production features of the audio file to be analyzed. Production features include any numerical features of the audio file to be analyzed that describe a production objective, e.g. the spectral shape, dynamic range, loudness, stereo width, masking; and may further include any statistical measures of time-series of these features, e.g. mean, variance, skewness, kurtosis, median, mode, maximum, minimum, derivative, integral, sum. These may relate to the entirety of each audio signal in the audio file to be analyzed, or regions thereof.

In one embodiment, the semantic data extractor 632 further receives semantic data for the audio file to be analyzed, that is received from the user interface. In one embodiment, the semantic data received from the user interface comprises classification features, which are then combined with the classification features determined by the automatic audio classifier 644. In one embodiment, the semantic data received from the user interface comprises chromosomal features, which are input to the automatic audio classifier 644 prior to classification, and which are combined with the chromosomal features determined by the chromosomal feature extractor 642. In one embodiment, the semantic data received from the user interface comprises production features, which are combined with the production features output by the production feature extractor 646.

The semantic data extractor 632 then outputs the semantic data, i.e. the classification features, the chromosomal features, and/or the production features.

Figure 18:
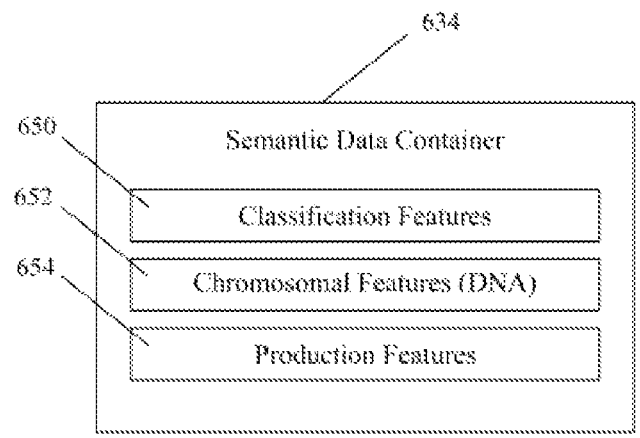
FIG. 18 illustrates semantic data contained in a semantic data container, in accordance with an embodiment.

FIG. 18 illustrates one embodiment of the semantic data for the audio file to be analyzed that is contained in the semantic data container 634. The semantic data includes at least one of the following data types: classification features 650, chromosomal features 652, and production features 654. In one embodiment, the semantic data container 634 is adapted to combine the semantic data received from the semantic data extractor 632 with the semantic data received from the user interface 640.

Figure 19:
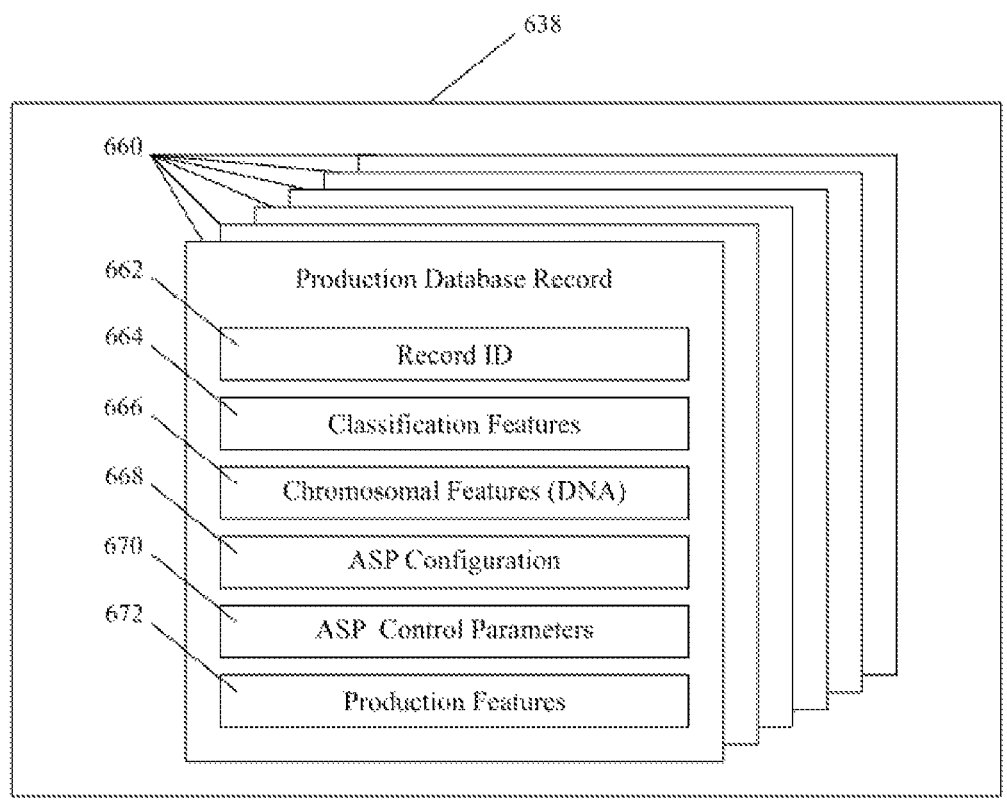
FIG. 19 illustrates reference data records contained in a production database, in accordance with an embodiment.

FIG. 19 illustrates one embodiment of the production database 638, which contains a number of reference records 660, each of which describes a respective reference produced audio file, and the methodology used in its production. The production database 638 may be built by extracting data from commercially produced audio files, or by direct analysis of audio engineering practice for example. For each reference record 660, the production database comprises a respective record identification (ID) 662, respective classification features 664, respective chromosomal features 666, a respective audio signal processor (ASP) configuration 668, respective ASP control parameters 670, and respective production features 672.

Classification features 664 comprise any categorical features that may be used to describe the reference produced audio file, e.g. genre, instrumentation, artist; and any categorical description of the production objectives, e.g. production style (year or specific producer), emotive context, etc.

Chromosomal features 666 comprise any numerical features that may be used to describe the reference produced audio file, e.g. tempo, harmonic content, Mel-Frequency Cepstral Coefficients (MFCCs), Sub-Band Flux (SBF), and all features from the Music Information Retrieval (MIR) literature; and may further comprise any statistical measures of time-series of these features, e.g. mean, variance, skewness, kurtosis, median, mode, maximum, minimum, derivative, integral, sum. These may relate to the entirety of each audio signal in the reference produced audio file, or regions thereof The ASP configuration 668 describes the specific configuration in the chain of audio signal processing tools or processors used to produce the reference produced audio file, e.g. for mastering: compressor→EQ→multi-band compressor→limiter. The configuration may also include specific algorithms and or implementations for each audio signal processing tool, e.g. multi-band compressor: TC Electronic M3D Multi-band Dynamics.

The ASP control parameters 670 contain data for controlling for the audio signal processing tools used to produce the reference produced audio file, e.g. compressor knee: −3 dB, limiter attack time: 1 millisecond.

The production features 672 comprise any numerical features of the reference produced audio file that describe a production objective, e.g. the spectral shape, dynamic range, loudness, stereo width, masking; and may further comprise any statistical measures of time-series of these features, e.g. mean, variance, skewness, kurtosis, median, mode, maximum, minimum, derivative, integral, sum. These may relate to the entirety of each audio signal in the database audio file, or regions thereof.

Figure 20:
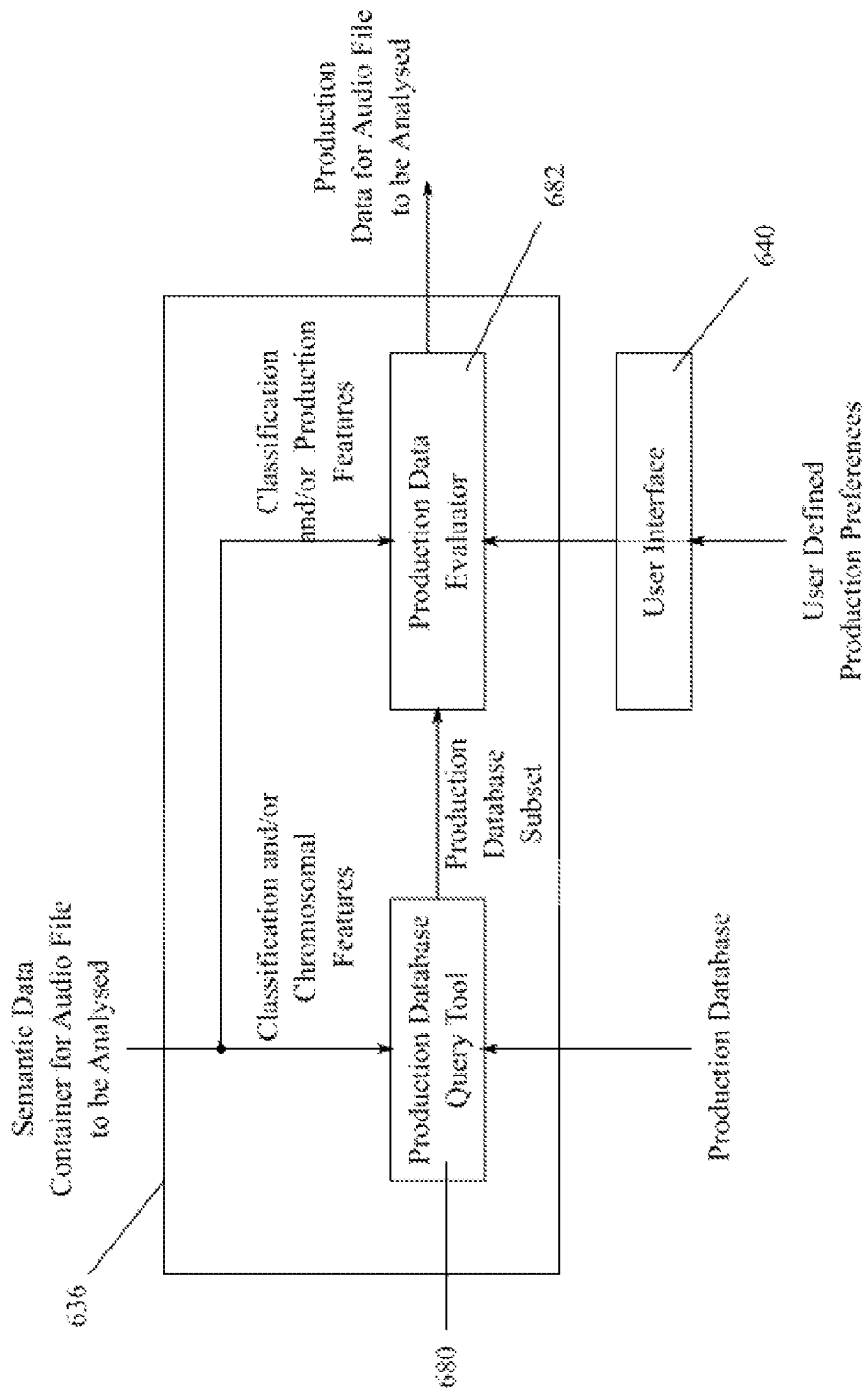
FIG. 20 is a block diagram of an inference engine, in accordance with an embodiment.

FIG. 20 illustrates one embodiment of the inference engine 636. The semantic data for the audio file to be analyzed is received from the semantic data container 634, and is separated, where the classification features and/or chromosomal features are sent to a production database query tool 680, and the classification features and/or production features are sent to a production data evaluator 682. The production database query tool 680 identifies a subset of reference records 660 from the production database 638 that are similar to the audio file to be analyzed, in terms of classification and/or chromosomal features. The production data evaluator 682 receives the identified subset of reference records 660, and derives and outputs production data for the audio file to be analyzed.

In one embodiment, the production data evaluator 682 comprises the classification features of the audio file to be analyzed in deriving the production data. These are special cases where the classification features necessitate a modification in the production data that may not be reflected or captured in the production database 638, e.g. the intended output destination of the subsequent production.

In one embodiment, the production data evaluator 682 includes the production features of the audio file to be analyzed in deriving the production data.

In one embodiment, the production data evaluator 682 includes the user defined production preferences which are input via the user interface 640, in deriving the production data.

The semantic analysis module 622 (SAM) will now be illustrated using a number of examples, each of which can be considered a separate embodiment. This should not be considered an exhaustive list. The examples relate to audio files that contain a single mono or stereo audio signal, but the same principles may be applied to audio files that contain a plurality of audio signals.

SAM Example 1

An audio file containing a stereo audio signal is input to the semantic analysis module 622, with no accompanying semantic data received from the user interface. The semantic data extractor 632 extracts the chromosomal features of the audio file, which in this example are the mean of the first ten MFFC coefficients. The automatic audio classifier 644 uses an SVM to classify the audio file into a specific genre, based on its chromosomal features, and identifies its genre to be electronic dance music (EDM), for example. This classification feature, i.e. genre: EDM, is then sent to the inference engine 636, and on to the production database query tool 680. The production database query tool 680 identifies all reference records 660 within the production database 638 with classification feature; genre: EDM, and this subset of reference records 660 are sent to the production data evaluator 682.

The production data evaluator 682 examines the ASP configuration 668 for each reference record 660 in the identified subset, and determines a common configuration. In this example, the common configuration is: High Pass Filter→Spatial Processor→Equalizer→Multi-band Compressor→Limiter. This configuration is then stored in the ASP configuration field of the production data for the audio file to be analyzed.

The production data evaluator 682 examines the ASP control parameters 670 for each record in the subset, and evaluates the distribution in these parameters. In this example, the control parameters of interest are: (i) the frequency bands on multi-band compressor, (ii) the knee on the multi-band compressor, and (iii) the attack and release times for the limiter. For each parameter, the distribution across all records in the subset is analyzed, and the mean value is taken and is stored in the ASP control parameter field of the production data for the audio file to be analyzed. It should be understood that any adequate statistical measure of the distribution in control parameters may be used.

The production data evaluator 682 further examines the production features 672 for each reference record in the identified subset, and evaluates the distribution in these features. In this example, the production features of interest are (i) the overall spectral shape of the reference audio files, and (ii) the loudness of the reference audio files. For each feature, the distribution across all reference records is analyzed, and the mean value is taken and is stored in the production feature field of the production data for the audio file to be analyzed. It should be understood that any adequate statistical measure of the distribution in production features may be used.

The production data for the audio file to be analyzed is then output.

SAM Example 2

An audio file containing a stereo audio signal is input to the semantic analysis module 622, with no accompanying semantic data. The semantic data extractor 632 extracts the chromosomal features of the audio file, which in this example are: the mean of the first ten MFFC coefficients, the variance in ten SBF bands, and the tempo. The automatic audio classifier 644 is bypassed, and the chromosomal features only are sent to the inference engine 636, and on to the production database query tool 680. The production database query tool 680 uses a K-Nearest Neighbour (KNN) algorithm to identify a subset of K reference records from the production database 638 whose chromosomal features are most similar to those of the audio file to be analyzed. In this example K=10, hence a subset of 10 records are sent to the production data evaluator 682; and the system operates in line with SAM Example 1.

SAM Example 3

An audio file containing a stereo audio signal is input to the semantic analysis module 622, with no accompanying semantic data. The semantic data extractor 632 extracts the chromosomal features of the audio file, which in this example are: the mean of the first ten MFFC coefficients, the variance in ten SBF bands, and the tempo. The automatic audio classifier 644 uses an SVM to classify the audio file into a specific genre, based on a subset of its chromosomal features—in this case the first ten MFCC coefficients—and identifies its genre to be electronic dance music (EDM). This classification feature; genre: EDM, as well as the chromosomal features are then sent to the inference engine 636, and on to the production database query tool 680. The production database query tool 680 identifies all reference records within the production database 638 with classification feature; genre: EDM. In this example, this produces 1000 records, so to reduce this subset, the KNN algorithm is used to identify a secondary subset of ten records whose chromosomal features are most similar to those of the audio file to be analyzed. These ten records are sent to the production data evaluator 682 and the system operates in line with SAM Example 1.

SAM Example 4

An audio file containing a stereo audio signal is input to the semantic analysis module 622, with no accompanying semantic data. The semantic data extractor 632 extracts the chromosomal features of the audio file, which in this example are the mean of the first ten SBF bands. The automatic audio classifier 644 uses an SVM to classify the audio file into a specific genre, based on its chromosomal features, and identifies its genre to be rock music. In addition to this, the user provides semantic data via the user interface 640, indicating that the mood of the music should be high intensity, and that the production style should be based on Producer X. Therefore, the classification features are; genre: EDM, mood: high intensity, and producer: Producer X; and these are passed to the inference engine 636. The database query tool 680 selects a subset of reference records from the production database that confirms to this classification. The identified reference records are sent to the production data evaluator 682, and the system operates in line with SAM Example 1.

SAM Example 5

An audio file containing a stereo audio signal is input to the semantic analysis module 622, and has accompanying semantic data classifying the genre to be pop music. The semantic data extractor 632 extracts the chromosomal features of the audio file, which in this example are: the mean of the first ten MFCC coefficients, the variance in ten SBF bands, and the tempo. The automatic audio classifier 644 is bypassed, and the classification feature; genre: pop music, as well as the chromosomal features are then sent to the inference engine 636, and on to the production database query tool 680. The production database query tool 680 identifies all reference records within the production database 638 with classification feature; genre: pop music. In this example, this produces 1000 records, so to reduce this subset the KNN algorithm is used to identify a secondary subset of ten reference records whose chromosomal features are most similar to those of the audio file to be analyzed. These ten reference records are sent to the production data evaluator 682 and the system operates in line with SAM Example 1.

SAM Example 6

The audio file and semantic data from SAM Example 4 are input, along with user defined semantic data indicating that the output destination for the production is streaming on SoundCloud; hence the classification features are: genre: EDM, mood: high intensity, producer: Producer X, and output destination: SoundCloud streaming. The first three classification features are used to identify the production database subset, but the output destination: SoundCloud streaming is not stored within the production database, so it is sent directly to the production data evaluator 682. This output destination class incorporates data compression, and as such is susceptible to clipping if the peak output level is too high. Therefore the production data evaluator 682 directly sets the maximum peak output level to −1 dB, instead of −0.3 dB which is used with other output destinations. The other parts of this example work in line with SAM Example 4.

SAM Example 7

The audio file from SAM Example 1 has been analyzed, but in addition, the user has provided user production preferences, indicating that a bright production is preferred. The system follows that shown in SAM Example 1, but the production data evaluator 682 modifies the overall spectral shape in the production data for audio file to be analyzed, to provide a brighter sound. For example, the modification of the overall spectral shape may be performed by adding a predefined offset to the overall spectral shape, which in the case of brightness would relate to an increase in energy between about 2 and about 5 kHz.

SAM Example 8

The audio file from SAM Example 1 has been analyzed, but in addition, the user has explicitly provided user production preferences, in the form of production data of either: ASP configuration, ASP control parameters, or production features. The system follows that shown in SAM Example 1, but the production data provided by the user overwrites that derived at earlier stages in the semantic analysis module, e.g. the user defines a preferred limiter implementation, high-pass filter frequency cutoff, and the RMS Level for the audio file to be analyzed. This provides a route for direct control over the autonomous audio production system 8 in terms of production data.

SAM Example 9

The audio file from SAM Example 1 has been analyzed, but in addition, the user has explicitly provided a subset of reference records from the production database 638 that the production should be based on, e.g. all productions by a specific artist, or from a specific album. The production database query tool 680 ignores the classification and/or chromosomal features, and directly sends the user selected subset of production database records 660 to the production data evaluator 682.

SAM Example 10

The audio file from SAM Example 1 has been analyzed, but in addition, the production feature extractor 642 has returned a high level of low frequency energy. The system follows that shown in SAM Example 1, but this production feature is also sent to the production data evaluator 682, which modifies the ASP control parameters for the high pass filter to apply more gain to attenuate the low frequency energy in the system.

SAM Example 11

The audio file from SAM Example 1 has been analyzed, but in addition, the semantic data extractor 642 has performed an automatic segmentation algorithm, with some manual user interface adjustment, to divide the audio signal into sections: in this case, a 5-second region that represents the loudest part of the file, a 5-second section that best represents the song overall in terms of loudness and frequency content, and verses/choruses. The production feature extractor 642 returns features for each section separately and the whole song, and the production data evaluator 682 uses the data from the appropriate section to determine the production data for different features, e.g. RMS level taken from the loudest section to dynamically determine the limiter threshold. The system follows that shown in SAM Example 1.

SAM Example 12

The audio file from SAM Example 1 has been analyzed, but in addition, the production feature extractor 642 has returned a high level of noise: −20 dB. The system follows that shown in SAM Example 1, but this production feature is also sent to the production data evaluator 682, which modifies the ASP configuration to include a denoiser (used to remove noise from audio signals) at the start of the ASP chain, and sets the denoise ASP control parameters based on the noise level and the overall spectral shape of the audio file (also evaluated by the production feature extractor).

SAM Example 13

The audio file from SAM Example 1 has been analyzed, but in addition the user inputs a secondary reference audio file, which represents the desired production objectives. The reference audio file is sent to the semantic data extractor, and its classification, chromosomal and production feature are evaluated. In this example the reference audio file is classified as genre: EDM, the reference chromosomal features are the first ten SBF bands, and the reference production feature RMS Level: −9 dB Fs. The production database query tool 680 identifies all records based on the reference audio file classification (genre: EDM), and uses KNN to find the 5 records from the production database that most closely match the reference audio file chromosomal features; and these are then sent to the production data evaluator 682. The production data evaluator 682 bases the ASP configuration and control parameters on the records identified by the KNN, and sets the production features based on those extracted from the reference audio file (i.e. RMS Level: −9 dB Fs). This enables "production matching" to a reference audio file.

Figure 21:
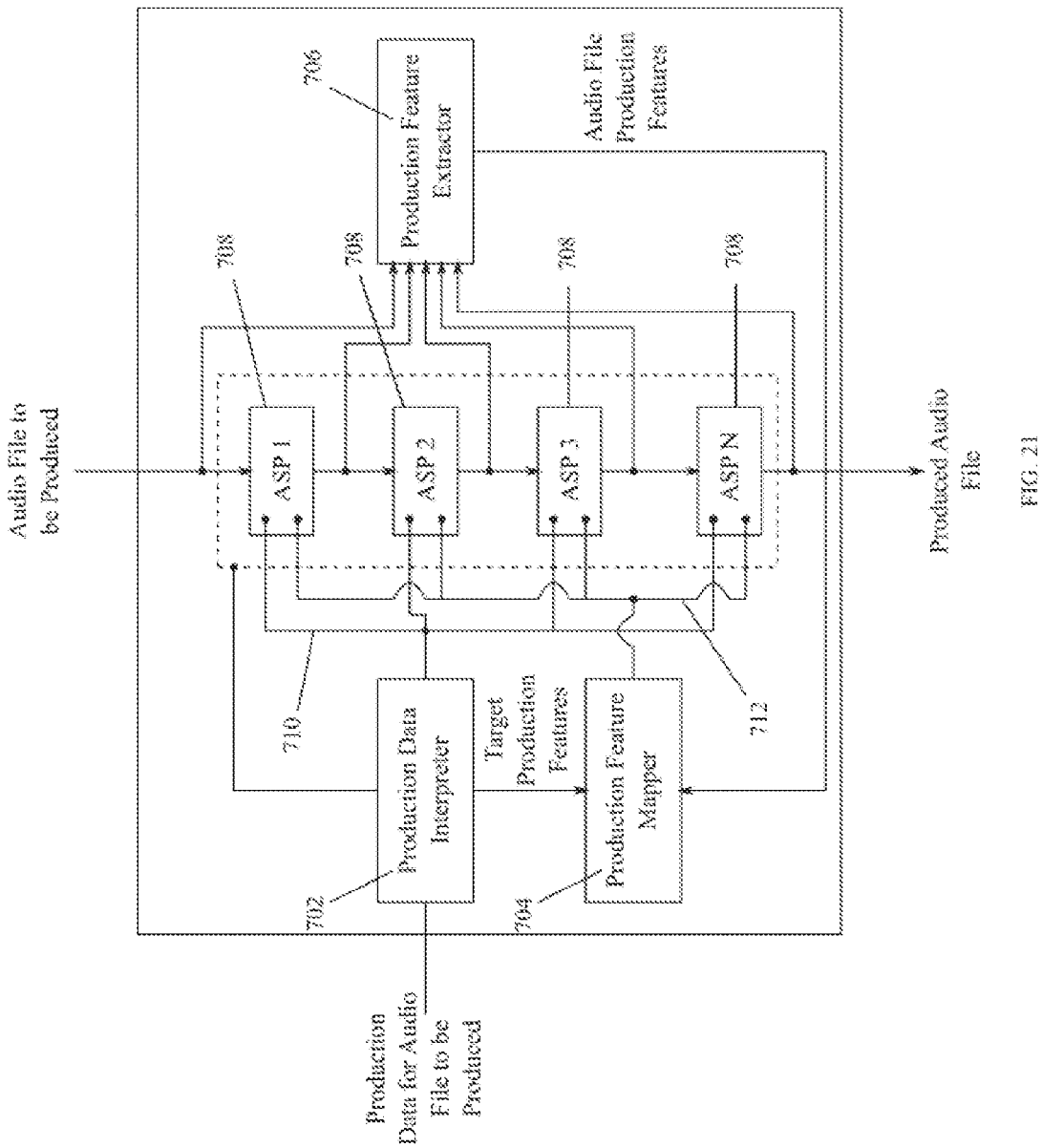
FIG. 21 is a block diagram of a first exemplary autonomous audio production system.

FIG. 21 illustrates one embodiment of an autonomous audio production system 624, which takes as input the audio file to be produced and the production data, and outputs a produced audio file. The autonomous audio production system comprises a production data interpreter 702, a production feature mapper 704, a production feature extractor 706, and a plurality of ASPs 708. In one embodiment, the production feature extractor 706 is independent from the production feature extractor 646. In another embodiment, the production feature extractor 706 corresponds to the production feature extractor 646.

In this embodiment each ASP 708 is adapted to perform a respective audio processing action. While in the present embodiment, they are organized according to a serial configuration, i.e. they are configured to process the audio signals contained in the audio file in serial, it should be understood that the ASPs may be organized according to a parallel configuration, i.e. they may process the audio signal in parallel.

The autonomous audio production system 624 receives the production data for the audio file to be produced from the semantic analysis module 622. This production data is passed to the production data interpreter 702, which does at least one of the following: (i) sets the ASP configuration 708, (ii) sets the ASP control parameter presets 710, and (iii) sends the production features for the audio file to be produced to the production feature mapper 704. These actions will now be explained in greater detail.

In one embodiment, the production data interpreter 702 reads the ASP configuration from the production data, and uses this to set up the ASP processing chain, i.e. determining the relative order of the ASPs 708 within the chain. For example and referring back to SAM Example 1 above, there would be five ASPs, where ASP 1-5 corresponding to High Pass Filter, Spatial Processor, Equalizer, Multi-band Compressor, and Limiter, respectively.

In one embodiment, the production data interpreter 702 reads the ASP control parameter presets from the production data, and uses them to set the corresponding presets in the ASPs 708. For example and referring back to SAM Example 1 above, ASP 4 (Multi-band Compressor) would be sent control parameters for its frequency bands, and for the knee on each compression band; and ASP 5 (Limiter) would be sent attack and release times.

In one embodiment, the production data interpreter 702 reads the target production features from the production data, and sends them to the production feature mapper 704. The production feature mapper 704 determines ASP control parameters sets control parameters on the ASPs 712 to map the target production features onto the produced audio file. In an embodiment of the production database, the target production features may relate to production features for the produced audio file. In another embodiment, the target production features may relate to the production features of the audio file at any intermitted stage in the ASP chain, i.e. between two of the ASPs 708.

In one embodiment, the production feature extractor 706 extracts production features from any point in the ASP chain, and passes them to the production feature mapper 704.

In one embodiment, the production feature extractor 706 uses analytical feature mapping to set the control parameters on the ASPs.

In one embodiment, the production feature extractor 706 uses iterative feature mapping to set the control parameters on the ASPs.

The autonomous audio production system (AAPS) will now be illustrated using a number of examples, each of which can be considered a separate embodiment. This should not be considered an exhaustive list. The examples relate to audio files that contain a single mono or stereo audio signal, but the same principles may be applied to audio files that contain a plurality of audio signals.

AAPS Example 1

FIG. 22

Figure 22:
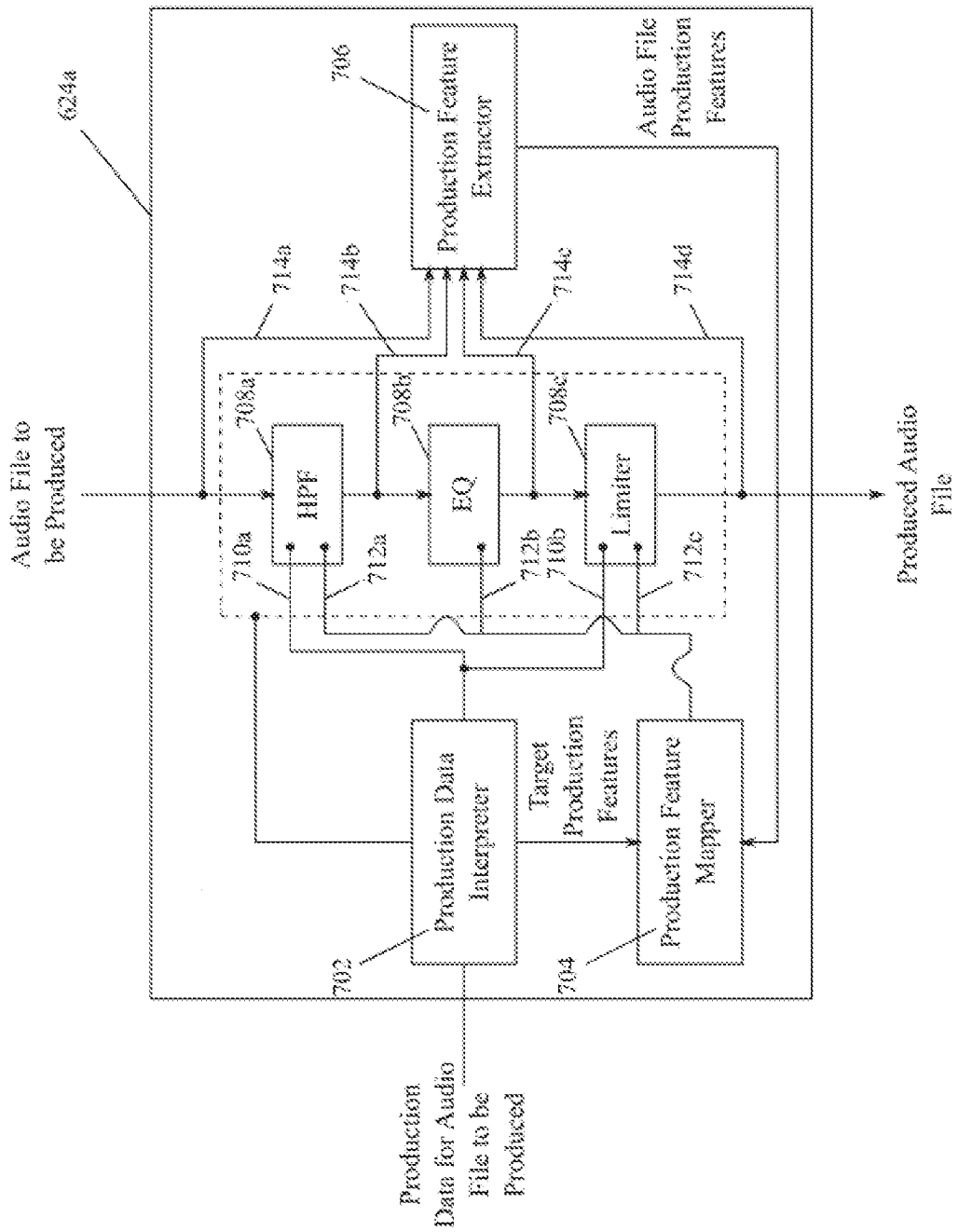
FIG. 22 is a block diagram of a second exemplary autonomous audio production system.

FIG. 22 illustrates one embodiment of an autonomous audio production system 624*a* which comprises three ASPs. The production data interpreter 702 receives production data for the audio file to be produced. It reads the ASP configuration fields, and in this example sets the processing chain to include three ASPs:
  A. A high-pass filter (HPF) 708*a*.
  B. An equalizer (EQ) 708*b*.
  C. A limiter 708*c*.

The production data interpreter 702 reads the ASP control parameters and sets:
  A. The cutoff frequency on the HPF at 710*a*
  B. The attack and release times on the limiter at 710*b*.
  C. The output level on the limiter at 710*b*.

The production data interpreter 702 reads the target production features from the audio file to be produced, and sends them to the production feature mapper 704. In this example the target production features are:
  A. The amount of energy below 50 Hz: evaluated from the intermediate signal after the HPF.
  B. The shape of the signal spectrum: evaluated from the intermediate signal after the EQ.
  C. The RMS level: evaluated from the output signal.

The production feature mapper 704 maps the target production features to control parameters on the ASPs:
  A. Amount of energy below 50 Hz→HPF gain control.
  B. Shape of signal spectrum→shape of EQ curve.
  C. RMS level→limiter threshold.

The production feature extractor 706 evaluates the amount of energy below 50 Hz before the HPF (at 714*a*), and sends this data to the production feature mapper 704. In this example, the energy below 50 Hz at 714*b* is −6 dB, but the target energy is −8 dB; hence the production feature mapper 704 sets the HPF gain control at 712*a* to −2 dB to adjust this production feature in the produced audio file. This is an example of an analytical feature mapping, whereby the production feature mapper can directly evaluate the control parameter to achieve the target production feature; in this case by simply taking the difference between the target production feature and the production feature extracted from the audio signal. These are sent to the HPF at 712*a*.

The production feature extractor 706 evaluates the shape of the signal spectrum before the EQ (at 714*b*). In this example, the shape of the signal spectrum is defined as the energy in twenty frequency bands from 50 Hz and above; and the EQ manipulates the frequency content by applying gain in equivalent frequency bands. The production feature mapper 704 evaluates the difference between the target shape of the spectrum, and the shape of the spectrum at 712*b*, for each frequency band. These differences are used to set the gain in each band, and are sent to the EQ at 712*b*. This is another example of analytical feature mapping.

The production feature extractor 706 evaluates the RMS level of the signal both before (at 714*c*) and after the limiter (at 714*d*). In this example, the target RMS is −8 dB FS, and the RMS at 714*c* is −14 dB FS. The key difference with mapping this target production feature is that the limiter processing algorithm is nonlinear, so it is not possible to use an analytical feature mapping. Instead, an iterative mapping algorithm is used. Any adequate iterative mapping algorithm may use such as adequate deterministic algorithms and adequate stochastic algorithms. The former use derivative information in the relationship between production features and control parameters, to converge to the control parameters that give the minimum error, e, (between target and extracted production features), e.g. Gauss-Newton method. The latter algorithms search the control parameter space in a semi-random way to find the control parameters that give the minimum error (between target and produced file production features), e.g. Genetic Algorithm, Simulated Annealing Algorithm.

In this example, the production feature mapper 704 uses the Gauss-Newton method, but the iterative approach holds for any kind of algorithm. The production feature mapper first estimates the threshold ($T_0$) setting using an approximate algorithmic mapping, e.g. by taking the difference between the target and signal RMS level:

$$T_0 = RMS_{99c} - RMS_{target} = -6 \text{ dB}$$

The starting error in the production features, $e_0$, is evaluated by comparing the production feature values of the produced audio file to the target production feature, for the starting threshold. The key difference to analytical production feature mapping is that the threshold estimate is set at 712*c*, the signal is processed, and the production feature extractor 706 recalculates the production features of the signal to be produced.

$$e_0 = (RMS_{99d}(T_0) - RMS_{target}(T_0))^2$$

The production feature mapper then evaluates the numerical gradient of the error, $e_0$, with respect to changes in the threshold, T. This is done by perturbing the threshold by a small amount, dT, re-processing the signal, and re-evaluating the production features at 714*d* using the production feature extractor.

$$\left(\frac{de_0}{dT}\right) \approx \frac{e(T_0 + dT) - e(T_0)}{dT}$$

The next estimate of the threshold, $T_1$, where the "1" indicates the iteration index, is then evaluated using this derivative. The error, $e_1$, is then re-evaluated using this updated threshold.

$$T_1 = T_0 + \left(\frac{de_0}{dT}\right)^{-1} e_0$$

This process is repeated until the error at a given iteration is below a predefined tolerance, or the number of allowable iterations is reached.

AAPS Example 2

The production data for the audio file to be produced in AAPS Example 1 is received by the production data interpreter 702, the ASP configuration and control parameter data are read and set, and the low frequency energy is mapped to the HPF gain by the production feature mapper.

The difference in this example is that the target production features for both the shape of the spectrum and the RMS level are defined for the produced audio file (at 714*d*), rather than at intermediate stages in the processing chain. A motivation for this is to include the effect that the limiter has on the spectrum of the signal (the limiter primarily controls the dynamic range, but will have a secondary effect on the spectrum). The production feature mapper 704 and the production feature extractor 706 work in the same way as in AAPS Example 1, i.e. iterating to find the minimum error, but in this instance control parameters for both the EQ and the Limiter are found simultaneously. From a mathematical perspective, the equations are adapted such the control parameters and errors are contained in vectors, and the numerical derivative is contained within a matrix (known as the Jacobian).

AAPS Example 3

The production data for the audio file to be produced in AAPS Example 1 is received by the production data interpreter 702, the ASP configuration and control parameter data are read and set, and the production feature mapper maps the low frequency energy to the HPF gain, and the spectral shape to the gain in each EQ filter band.

The difference in this example is that the production features include an additional feature that defines the maximum amount of distortion that may be introduced by the limiter. It is used as a constraint in the iterative feature mapping algorithm, to prevent excessive distortion being introduced by the limiter processing, i.e. the algorithm attempts to provide the target RMS level, whilst observing a hard limit on the amount of distortion that can be introduced.

AAPS Example 4

The autonomous audio production system operates in line with AAPS Example 3, but receives additional user production preference production features, that describe the acceptable trade-off between the RMS level and the distortion introduced by the limiter. In this example, the user wants a high RMS mix, and is willing to tolerate more distortion if necessary, e.g. the maximum allowable distortion is evaluated from the production database as five distortion units, but the user defines it as seven distortion units for this example. The iterative feature mapping algorithm is adapted accordingly to soften the constraining effect that the distortion limit has on the processing of the limiter.

Producing Audio Files Containing a Plurality of Signals

Figure 23:
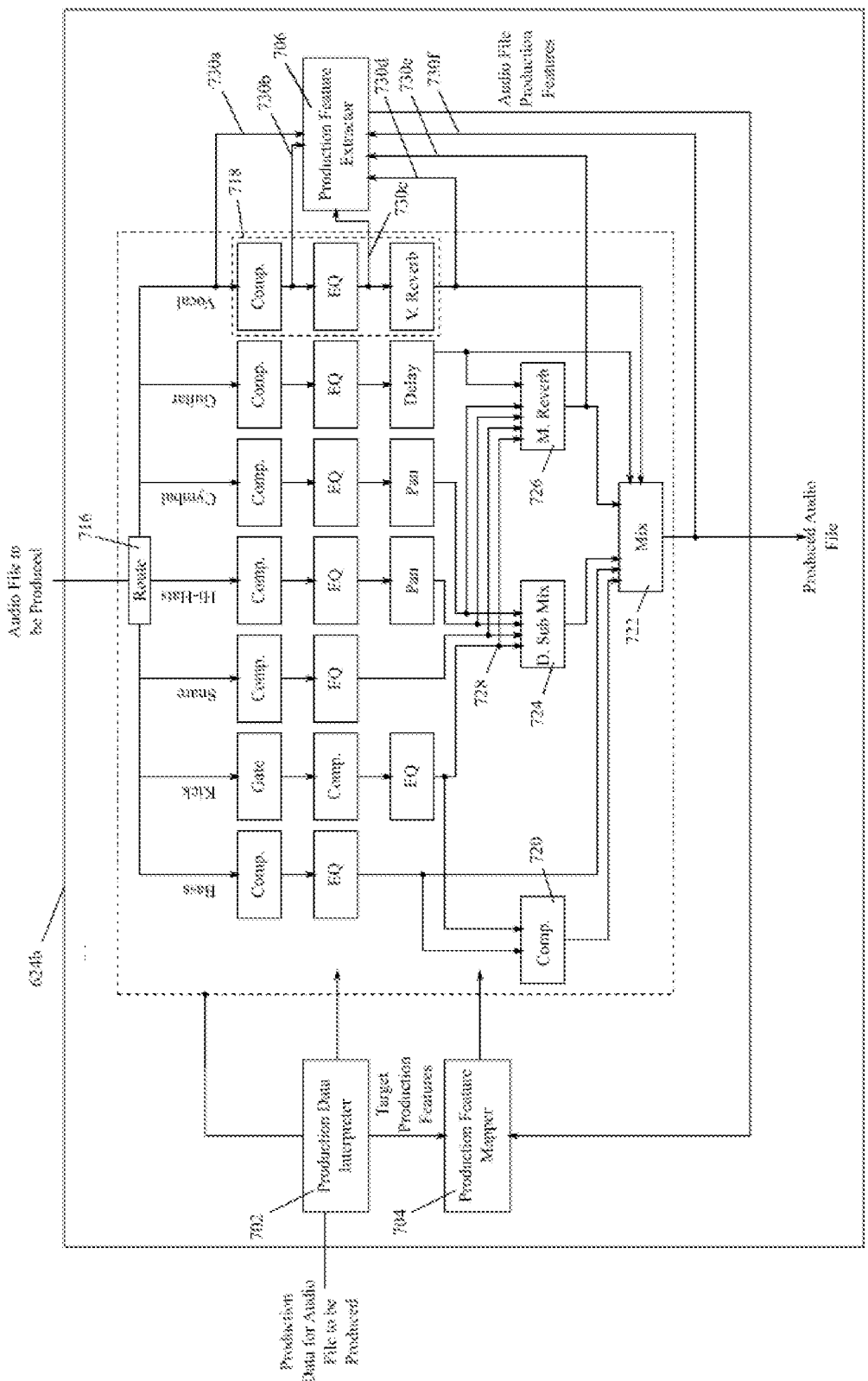
FIG. 23 is a block diagram of a third exemplary autonomous audio production system.

FIG. 23 illustrates one embodiment of an autonomous audio production system 624b when the audio file to be produced contains a plurality of audio signals. In general, it operates in the same way as discussed previously for audio files containing a single mono or stereo audio signal, but is explained here for further clarity. It should be understood that the specific ASP configuration illustrated in FIG. 23 is exemplary only.

The production data interpreter 702 receives production data for the audio file to be produced. It evaluates the ASP configuration, and uses this to set the ASPs in the processing chain. The ASP configuration includes labels identifying the instrument type for each audio signal in the audio file to be produced, and defines their routing at 716 to their respective processing chains. In this example, the audio file contains audio signals (mono or stereo) for: bass, kick, snare, hi-hats, cymbal, guitar and vocal; and each audio signal has its own processing chain. The processing chain for the vocal 718 comprises a compressor, an equalizer and a vocal reverberation unit. These can be considered as "tracks" in audio production terminology.

The ASP configuration in the production data includes additional routing information:

the bass and kick audio signals are routed to a compressor 720 after their individual processing chains. These two signals can be processed as a single signal, and recombined with the rest of the signals in the mix at 722.

all of the drum signals (kick, snare, hi-hats and cymbal) are routed to a drum sub-mix 724. This provides control over the drums as a single entity when recombining them with the rest of the signals in the mix at 106.

all of the music signals (i.e. all except from the vocal) are sent to a common music reverberation processor 726. This provides a common reverberation effect to be applied to all musical signals, and provides control over the overall reverberation intensity when recombining with the rest of the signals in the mix at 722.

at 722 all of the audio signals are combined to give the produced audio file.

The ASP control parameters in the production data may relate to any ASPs in the chosen configuration, whether in an audio signal's own processing chain, or part of a specific routing. Additional control parameters are included to control the amount of a signal that is routed during any of the routing stages in the configuration. For example, at 728, the kick signal is routed to the music reverberation processor 726, so there is a corresponding gain parameter that determines how much of the signal is routed, e.g. −6 dB.

The production features in the production data may relate to any point in the configuration, whether in an audio signal's own processing chain, or part of a specific routing; and the production feature extractor evaluates them at corresponding positions. For example:

at 730a-730d production features are extracted from points in the vocal signal's processing chain.

at 730e production features are extracted from the audio signal output by the music reverberation processor.

at 730f production features are extracted after all audio signals are combined, i.e. from the produced audio file.

In an embodiment of the production feature mapper it uses analytical and/or iterative production feature mapping to derive control parameter data.

In an embodiment of the production feature mapper it uses individual production features to derive control parameter data. For example, it may use the spectral shape of the vocal signal to set the equalizer in the vocal processing chain.

In an embodiment of the production feature mapper it uses combinations of production features to derive control parameter data. For example, it may use the loudness of the music reverberation signals 730e, and the loudness of the mixed audio signal 730f, to set the output gain on the music reverberation effect.

User Evaluation and Self-Learning

Figure 24:
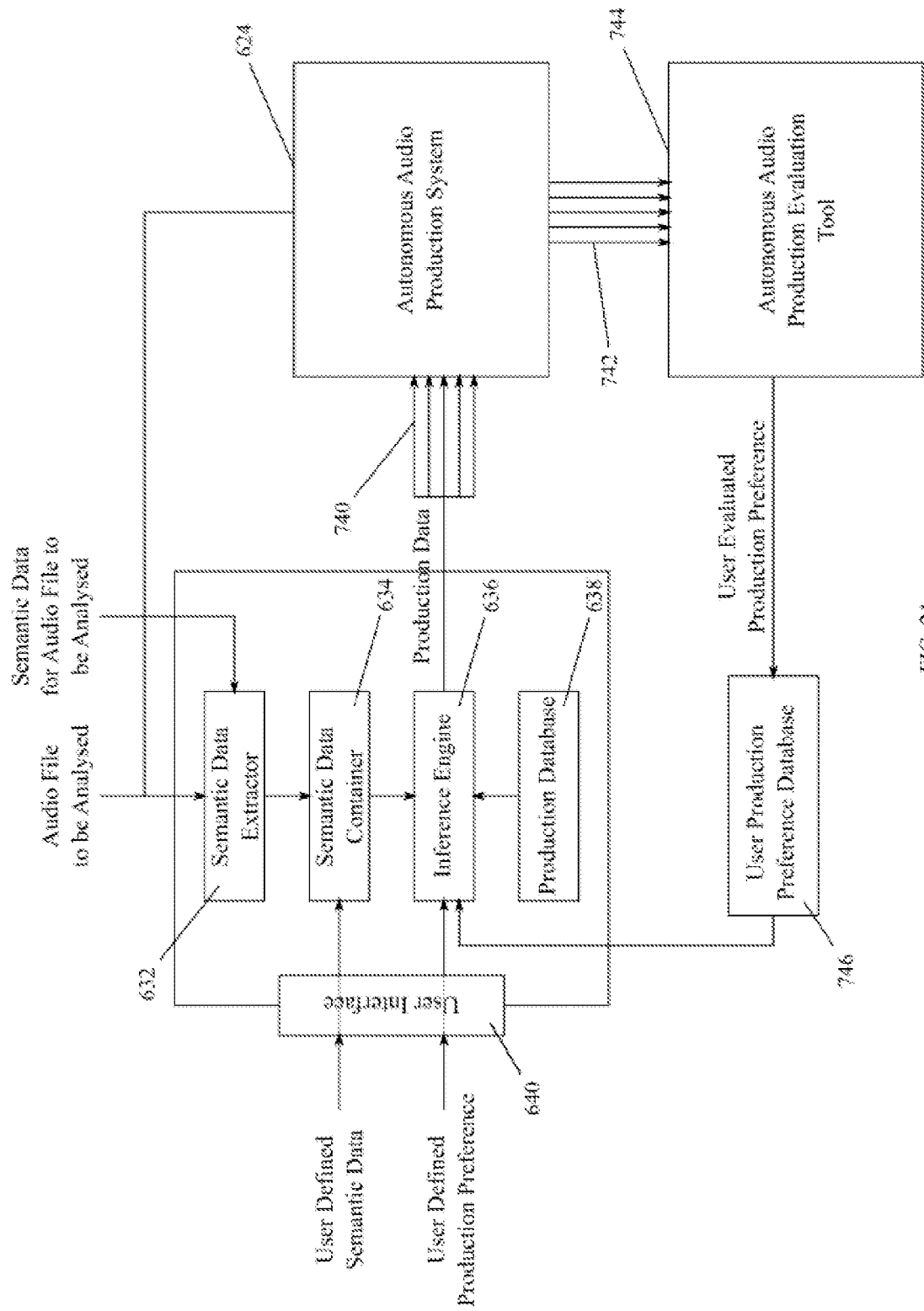
FIG. 24 is a block diagram of an autonomous audio production system comprising user evaluation and self-learning feedback, in accordance with an embodiment.

FIG. 24 shows an embodiment of the semantic analysis module wherein the inference engine 636 derives multiple sets of production data 740 for the audio file to be analyzed, each of which reflects an alternative production. For example, these variations in production data may be derived:

using user defined production preferences.

by using a set of different machine learning algorithms and/or variables in the semantic data extractor 632 to output sets of: classification, chromosomal and production features, e.g. one set may use a first SVM to classify genre to a high granularity, the second set may use a second and different SVM to classify genre to coarse granularity whilst including production features, and the third set may only use chromosomal features.

by using a set of different machine learning algorithms and/or variables in the database query tool 680, e.g. by changing the number of records sent to the production data evaluator 682.

- by configuring the production data evaluator 682 to derive production data using different statistical measures of the production database subset, e.g. set 1 may use the mode, set 2 may use the median, and set 3 may use the mean.
- by configuring the production data evaluator 682 to choose specific records from the production database subset to base the production data on, e.g. if the production database subset contains five records, each of these could be used as a separate production data set for the audio file to be analyzed.
- by randomly perturbing any part of the production data derived by the production data evaluator 682, i.e. ASP configuration, ASP control parameters or production features.

In the embodiment shown in FIG. 24, there are five sets of production data 740, and these are sent to the autonomous audio production system 624, which outputs produced audio files 742 for each set.

The set of produced audio files are received by the autonomous audio production evaluation tool 744, which provides an interface through which users may evaluate the quality of the different produced audio files. The interface may incorporate:
- an A-B test, whereby users make pairwise comparisons of the different produced audio files.
- a multiple stimulus with hidden reference and anchor (MUSHRA) test, whereby users make simultaneous comparisons of the different produced audio files.

The autonomous audio production evaluation tool 744 outputs user evaluated production preferences based on the user evaluation, which are received and stored by the user production preference database 746.

The inference engine 636 has access to the user production preference database 746, and may use this information in either its production database query tool 680, or production data evaluator 682, to tailor the derived production data to a specific user, or user group, in the same way as manually input user defined production data. For example:
- evaluation preferences for a specific user may be used when the user inputs a new audio file to be analyzed.
- evaluation preference for a subgroup of users, e.g. all users who have input audio files classified as genre: EDM, mood: high intensity, may be used when a user inputs an audio file with the same classification.
- evaluation preferences from all users for any audio file classification may be used.

In this embodiment the system is able to learn and adapt to the preferences of its users.

In an embodiment the autonomous audio production evaluation tool 744 may be hosted externally from the system, e.g. on a separate website, to allow non-users of the system to perform the evaluation.

Time Information Production Data

In one embodiment, the production data derived by the semantic analysis module may relate to any of the following:
- a statistical measure over the duration of the audio signals in the audio file to be analyzed, e.g. the RMS Level of an audio signal may be taken over its full duration.
- a statistical measure over the duration a specific region of the audio signals in the audio file to be analyzed, e.g. the RMS Level of an audio signal may be taken over a small region such as a chorus.
- a time-series over the duration of the audio signals in the audio file to be analyzed, or regions thereof, e.g. the RMS Level of an audio signal may expressed as a function of time over its full duration, or over a small region such as chorus.

In an embodiment in which it relates to a specific region, the production data is time-stamped with the relevant timing information, e.g. RMS Level 40-50 seconds, or RMS Level in chorus.

In an embodiment of the production database 638, the ASP control parameters and production features may relate to any of the production data types above, e.g. RMS Level mean over duration of audio signal, RMS Level time series over duration of audio signal, RMS Level mean over chorus.

In one embodiment of the production data interpreter 702, ASP configuration production data may be expressed as a time series, and/or may be relevant to time-stamped sections, hence the ASP configuration sent at 708 may vary over the duration of the audio file to be produced.

In one embodiment of the production data interpreter 702, ASP control parameter production data may be expressed as a time series, and/or may be relevant to time-stamped sections, hence the ASP control parameter data sent at 710 may vary over the duration of the audio file to be produced.

In one embodiment, the production data interpreter 702, the production feature mapper 704, and the production feature extractor 706 may use production features that are expressed as time series, and/or may be relevant to time-stamped sections, hence their operation, and the output of control parameters by the production feature mapper 704 at 712, may vary over the duration of the audio file to be produced.

Real-Time Considerations

In one embodiment, the system operates in non-realtime, whereby the output of the produced audio file and the input of the audio file to be produced are not synchronised in a time. In this case, the semantic analysis module 622 and the autonomous audio production system 624 have access to the whole audio file prior to producing the produced audio file.

In another embodiment, the system operate in substantially real-time, whereby the output of the produced audio file is synchronised with the audio file to be produced, e.g. in a live environment where the produced audio file is output via a sound reinforcement system. In this case, the semantic analysis module 622 and the autonomous audio production system 624 do not have access to the whole audio file prior to producing the produced audio file, i.e. parts of the audio signal are input on a frame-by-frame basis. In order to accommodate this:
- semantic data that accompanies the audio file is used to derive immediate production data upon its input.
- the semantic analysis module stores the semantic data for each frame in the semantic data container 634, and continually derives production data as further portions of the audio file are received.
- changes in the production data sent to the autonomous audio production system 624 are smoothed to prevent abrupt changes in the processing being applied.
- in a live environment, a pre-recorded section of audio may be used to provide immediate production data, e.g. via a sound check, or prior performance.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the semantic mixing module 20, production system 10, production engine 504, etc.; any component of or related thereto, or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

What is claimed is:

1. A computer-implemented method for performing automatic audio production, comprising:
   receiving an audio signal to be processed via a semantic analysis module;
   receiving semantic information via the semantic analysis module, the semantic information comprising at least one of chromosomal features, classification features, and production features;
   determining at least one semantic-based rule using the received semantic information, the semantic-based rule comprising production data that defines how the audio signal to be processed should be produced;
   processing the audio signal to be processed using the production data via an audio processing module, thereby obtaining a produced audio signal, the production data comprising at least one of given audio processing actions to be performed and respective static characteristics for the given audio processing actions, a configuration for the audio processing actions, and target production features for the produced audio signal;
   outputting the produced audio signal via the audio processing module;
   wherein said determining the at least one semantic-based rule comprising production data comprises:
   accessing a database containing a plurality of reference records;
   identifying at least one reference record using the semantic information via the semantic analysis module; and
   assigning a value for the at least one of the given audio processing actions to be performed and the respective static characteristics for the given audio processing actions via the semantic analysis module, the configuration for the audio processing actions, and the target production features for the produced audio signal using the at least one identified reference record.

2. The computer-implemented method of claim 1, wherein the semantic information relates to the audio signal to be processed.

3. The computer-implemented method of claim 2, wherein the semantic information is received from a user interface.

4. The computer-implemented method of claim 2, further comprising determining the semantic information from the received audio signal.

5. The computer-implemented method of claim 1, wherein the semantic information relates to a reference audio signal, the method further comprising:
   receiving the reference audio signal; and
   extracting the semantic information from the reference audio signal.

6. The computer-implemented method of claim 1, wherein for each of the a plurality of reference records, the database comprises respective reference classification features, respective reference chromosomal features, a respective reference configuration for reference processing actions, respective reference static characteristics for the reference processing actions, and respective reference production features.

7. The computer-implemented method of claim 6, further comprising determining dynamic characteristics for the given audio processing actions using the value assigned to the target production features.

8. The computer-implemented method of claim 7, said processing the audio signal comprises performing the given audio processing actions on the audio signal according to the configuration and using the static and dynamic characteristics.

9. The computer-implemented method of claim 8, further comprising determining a value of the production features between the given audio processing actions and modifying the dynamic characteristics accordingly.

10. The computer-implemented method of claim 1, wherein said receiving the audio signal to be processed and outputting the produced audio signal are performed in substantially real-time so that the audio signal to be processed and the produced audio signal be synchronized.

11. The computer-implemented method of claim 1, wherein the production data is determined for only one region of the audio signal to be processed.

12. The computer-implemented method of claim 1, further comprising receiving user production preferences, said processing the audio signal being performed using the production data and the user production preferences.

13. The computer-implemented method of claim 12, further comprising evaluation of the produced audio signal from a user and determining the user production preferences using the received evaluation.

14. A computer readable medium having recorded thereon statements and instructions for execution by a processing unit to perform the steps of the method of claim 1.

15. The computer-implemented method of claim 6, wherein said identifying at least one reference record comprises identifying the at least one reference record that matches the at least one of chromosomal features, classification features, and production features contained in the semantic information.

16. An automatic audio production system comprising:
   a semantic analysis module for receiving semantic information and determining at least one semantic-based rule using the received semantic information, the semantic information comprising at least one of chromosomal features, classification features, and production features, the semantic-based rule comprising production data that defines how an audio signal to be processed should be produced, and the production data comprising at least one of given audio processing actions to be performed and respective static control parameters for the given audio processing actions, a configuration for the audio processing actions, and target production features for the produced audio signal; and an audio processing module for receiving the audio signal to be processed, processing the audio signal to be processed using the production data, in order to obtain a produced audio signal, and outputting the produced audio signal; and a production database containing a plurality of reference records, the semantic analysis module being further adapted to:
- identify at least one reference record using the semantic information; and
- assign a value for the at least one of the given audio processing actions to be performed and the respective static control parameters for the given audio processing actions, the configuration for the audio processing actions, and the target production features for the produced audio signal using the at least one identified reference record.

17. The automatic audio production system of claim 16, wherein the semantic information relates to the audio signal to be processed.

18. The automatic audio production system of claim 17, wherein the semantic analysis module is adapted to receive the semantic information from a user interface.

19. The automatic audio production system of claim 17, wherein the semantic analysis module is further adapted to receive the audio signal to be processed and determine the semantic information from the audio signal to be processed.

20. The automatic audio production system of claim 16, wherein the semantic information relates to a reference audio signal, the semantic analysis module being further adapted to:
- receive the reference audio signal; and
- extract the semantic information from the reference audio signal.

21. The automatic audio production system of claim 16, wherein for each one of the plurality of reference records, the database comprises respective reference classification features, respective reference chromosomal features, a respective reference configuration for reference processing actions, respective reference static control parameters for the reference processing actions, and respective reference production features.

22. The automatic audio production system of claim 21, wherein the audio processing module is adapted to determine dynamic control parameters for the given processing actions using the value assigned to the target production features.

23. The automatic audio production system of claim 22, wherein the audio processing module comprises a plurality of audio processors and is adapted to organize the plurality of audio processors according to the configuration and control the plurality of audio processors according to the static and dynamic control parameters.

24. The automatic audio production system of claim 23, wherein the audio processing module is further adapted to determine a value of the production features between the audio processors and modify the dynamic parameters accordingly.

25. The automatic audio production system of claim 16, wherein an input of the audio signal to be processed and an output of the produced audio signal are performed in substantially real-time so that the audio signal to be processed and the produced audio signal be synchronized.

26. The automatic audio production system of claim 16, wherein the semantic analysis module is adapted to determine the production data for only one region of the audio signal to be processed.

27. The automatic audio production system of claim 16, the semantic analysis module is further adapted to receive user production preferences and determine the production data using the user production preferences.

28. The automatic audio production system of claim 27, further comprising a production evaluation module for receiving an evaluation of the produced audio signal from a user and determining the user production preferences using the received evaluation.

29. The automatic audio production system of claim 21, wherein said identifying at least one reference record comprises identifying the at least one reference record that matches the at least one of chromosomal features, classification features, and production features contained in the semantic information.

* * * * *